United States Patent
Rodenbeck et al.

(10) Patent No.: US 12,007,271 B2
(45) Date of Patent: Jun. 11, 2024

(54) VIBROMETRY AND SOUND REPRODUCTION OF ACOUSTIC SOURCES ON MOVING PLATFORMS USING RADAR

(71) Applicant: The Government of the United States of America, as represented by the Secretary of the Navy, Arlington, VA (US)

(72) Inventors: Christopher T. Rodenbeck, Annandale, VA (US); Joshua B. Beun, Alexandria, VA (US); Ronald D. Lipps, San Diego, CA (US); Raghu G. Raj, Fairfax, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 0 days.

(21) Appl. No.: 17/406,040

(22) Filed: Aug. 18, 2021

(65) Prior Publication Data
US 2022/0365206 A1  Nov. 17, 2022

Related U.S. Application Data

(60) Provisional application No. 63/066,932, filed on Aug. 18, 2020.

(51) Int. Cl.
*G01H 9/00* (2006.01)
*G01S 7/41* (2006.01)
(Continued)

(52) U.S. Cl.
CPC .............. *G01H 9/00* (2013.01); *G01S 7/415* (2013.01); *G01S 13/582* (2013.01); *G01S 13/89* (2013.01)

(58) Field of Classification Search
CPC . G01S 13/90–9094; G01S 13/581–582; G01S 7/415; G01H 9/00
See application file for complete search history.

(56) References Cited

U.S. PATENT DOCUMENTS 5,424,749 A * 6/1995 Richmond .............. F41H 13/00
                                                342/194
5,565,872 A * 10/1996 Prevatt ................... G01S 13/50
                                                342/192

(Continued)

OTHER PUBLICATIONS

T. Zeng, R. Wang and F. Li, "SAR Image Autofocus Utilizing Minimum-Entropy Criterion," in IEEE Geoscience and Remote Sensing Letters, vol. 10, No. 6, pp. 1552-1556, Nov. 2013, doi: 10.1109/LGRS.2013.2261975. (Year: 2013).*

(Continued)

*Primary Examiner* — Matthew M Barker
(74) *Attorney, Agent, or Firm* — US Naval Research Laboratory; William P. Ladd

(57) ABSTRACT

Systems and methods are provided for interrogating a moving acoustic source using radar and processing data using a selection of motion compensation techniques adapted from synthetic aperture radar (SAR) to remove the effects of linear and nonlinear target motion so that the range-Doppler map retains only vibration information in the Doppler dimension. Vibration and sound waveforms can thus be selectively reproduced at specific ranges directly from the radar baseband waveform, without the need for additional complex analysis or audio processing.

20 Claims, 24 Drawing Sheets

(51) Int. Cl.
*G01S 13/58* (2006.01)
*G01S 13/89* (2006.01)

(56) References Cited

U.S. PATENT DOCUMENTS

| | | | | |
|---|---|---|---|---|
| 5,828,331 | A * | 10/1998 | Harper | G01S 7/352 |
| | | | | 342/22 |
| 2014/0112103 | A1* | 4/2014 | Goldman | G01S 15/66 |
| | | | | 367/118 |
| 2016/0054438 | A1* | 2/2016 | Patole | G01S 7/35 |
| | | | | 342/127 |
| 2023/0003835 | A1* | 1/2023 | Rong | G01H 9/00 |

OTHER PUBLICATIONS

K. Ramasubramanian and B. Ginsburg, "AWR1243 sensor: Highly integrated 76-81-GHz radar front-end for emerging ADAS applications," Texas Instruments White Paper, May 2017.

Robert Bosch GmbH, "Fourth generation long-range radar sensor (LRR4)," 2015.

J. Yan, Z. Peng, H. Hong, H. Chu, X. Zhu, C. Li, "Vital-SAR-imaging with a drone-based hybrid radar system," IEEE Trans. Microw. Theory Techn., vol. 66, No. 12, pp. 5852-5862, Dec. 2018.

A. Montuori et al., "The interferometric use of radar sensors for the urban monitoring of structural vibrations and surface displacements," IEEE J. Sel. Topics Appl. Earth Observ. Remote Sens., vol. 9, No. 8, pp. 3761-3776, Aug. 2016.

M. Voelkel, S. Mann, M. Frank, R. Weigel, and A. Hagelauer, "A high precision reconfigureable bistatic interferometric radar with Integrated six-port receiver at 60 GHz," German Microw. Conf., pp. 48-50, Mar. 2019.

R.H. Nakata, B. Haruna, T. Yamaguchi, V.M. Lubecke, S. Takayama, K. Takaba, "Motion compensation for an unmanned aerial vehicle remote radar life sensor," IEEE J. Emerging Selected Topics Circuits Syst., vol. 8, No. 2, pp. 329-337, Feb. 2018.

S. Shao, L. Zhang, H. Liu, and Y. Zhou, "Accelerated translational motion compensation with contrast maximisation optimisation algorithm for inverse synthetic aperture radar imaging," IET Radar Sonar Navigat., vol. 13, No. 2, pp. 316-325, Feb. 2019.

L. Yang, G. Bi, M. Xing and L. Zhang, "Airborne SAR moving target signatures and imagery based on LVD," IEEE Trans. Geosci. Remote Sens., vol. 53, No. 11, pp. 5958-5971, Nov. 2015.

J. Li, P. Wang, J. Chen, J. Wang, and W. Yang, "An improved two-step motion compensation method based on raw data," IEEE Int. Geosci. Remote Sens. Symp., pp. 4484-4486, Jul. 2015.

L. Zhang, Z. Qiao, M. Xing, L. Yang and Z. Bao, "A robust motion compensation approach for UAV SAR imagery," IEEE Trans. Geosci. Remote Sens, vol. 50, No. 8, pp. 3202-3218, Aug. 2012.

J. Yang, Y. Zhang and X. Kang, "A Doppler ambiguity tolerated algorithm for airborne SAR ground moving target imaging and motion parameters estimation," IEEE Geosci. Remote Sens. Lett., vol. 12, No. 12, pp. 2398-2402, Dec. 2015.

* cited by examiner

VIBROMETRY AND SOUND REPRODUCTION OF ACOUSTIC SOURCES ON MOVING PLATFORMS USING RADAR

CROSS REFERENCE TO RELATED APPLICATIONS

This application claims the benefit of U.S. Provisional Patent Application No. 63/066,932, filed on Aug. 18, 2020, which is incorporated by reference herein in its entirety.

FEDERALLY SPONSORED RESEARCH AND DEVELOPMENT

The United States Government has ownership rights in this invention. Licensing inquiries may be directed to Office of Technology Transfer at US Naval Research Laboratory, Code 1004, Washington, DC 20375, USA; +1.202.767.7230; techtran@nrl.navy.mil, referencing Navy Case Number 111980-US2.

FIELD OF THE DISCLOSURE

This disclosure relates to acoustics, including vibrometry.

BACKGROUND

Doppler radar provides an alternative to conventional techniques (e.g., accelerometers, lasers, microphones) for sensing small-scale vibrations. Predominant applications include the detection of vital signs, sound and speech, and structural vibration. Millimeter wave (MMW) vibrometry has received attention due to the widespread commercial availability of compact wideband transceivers at frequencies >60 GHz. Demonstrations are typically continuous wave (CW) at target distances ranging from a few millimeters to several meters.

Airborne synthetic aperture radar (SAR) systems also show capability to observe the vibration of loitering targets as distortion to the radar image, implying potential to extend radar vibrometry to remote sensing applications given the maturation of techniques for accurate extraction and analysis of the vibration in real-world environments.

Unfortunately, progress in Doppler vibrometry faces major limitations when it comes to the ability to sense the small-scale vibration of targets in motion. Radar sound/vibration reproduction results to-date require the targets under investigation to be conspicuously still. Although limited cyclic motion can be canceled at close range under constrained conditions using interferometric and multistatic techniques, such approaches greatly increase in cost and complexity for observation at longer standoff. Tracking people in motion implicitly requires the subjects to come to rest in order to detect and interpret vital signs, or else simply detect the presence of vibration without the ability to analytically reconstruct it.

Airborne motion compensation techniques leveraging onboard inertial measurement and/or global navigation sensors can correct for the dynamics of the interrogating radar but not for the dynamics of the target. Widespread micro-Doppler techniques provide a useful time-frequency methodology for analyzing and separating components of cyclic motion superimposed on bulk target motion (e.g., the analysis of human gait, gestures, rotor blades, bird flight, boat dynamics, etc.), but the superposition of multiple sources of motion remains a difficult issue; a radar demonstration of small-scale vibrometry and sound reproduction for targets in large scale motion is lacking.

BRIEF DESCRIPTION OF THE DRAWINGS/FIGURES

The accompanying drawings, which are incorporated in and constitute part of the specification, illustrate embodiments of the disclosure and, together with the general description given above and the detailed descriptions of embodiments given below, serve to explain the principles of the present disclosure. In the drawings.

Figure 22:
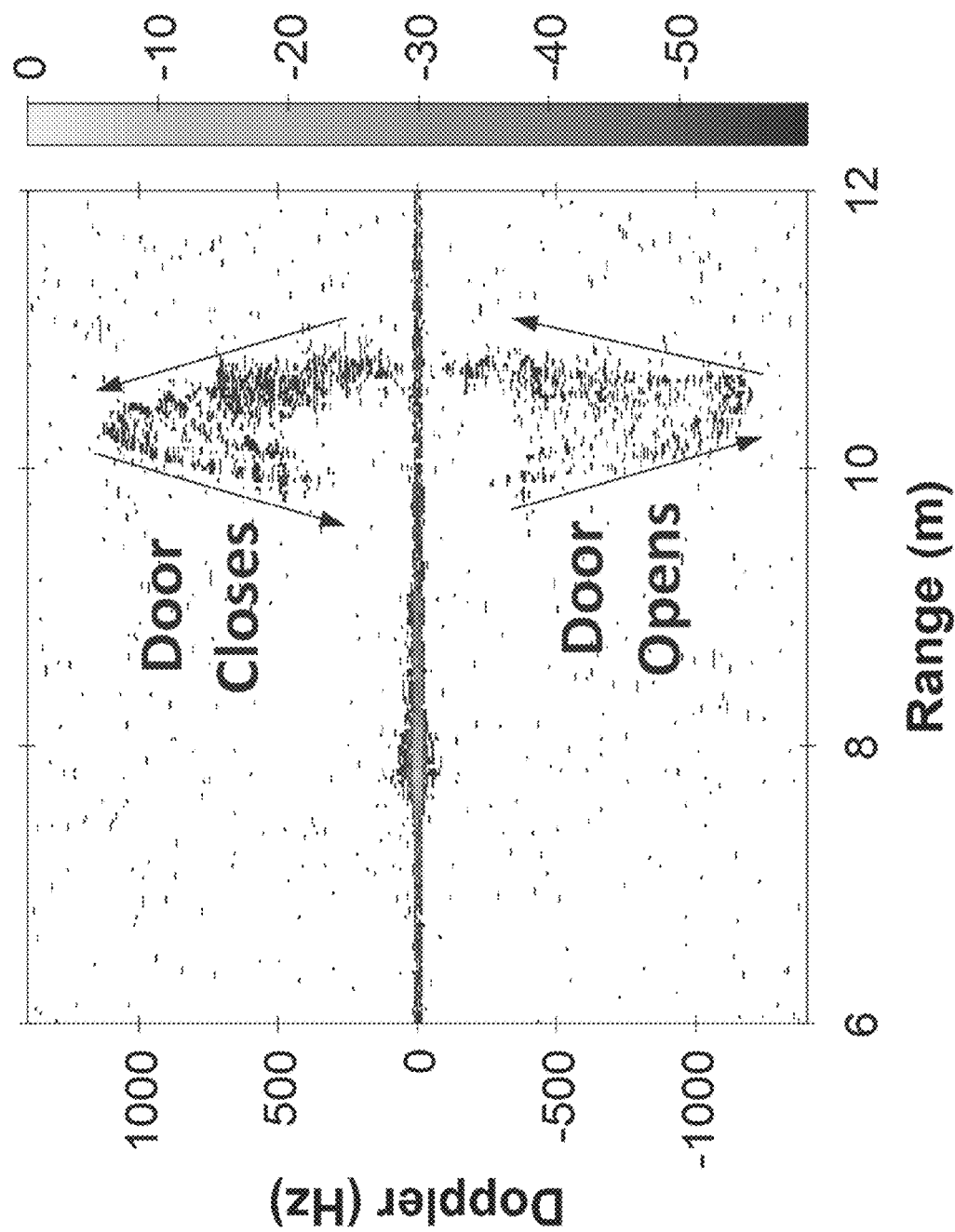
Figure 23:
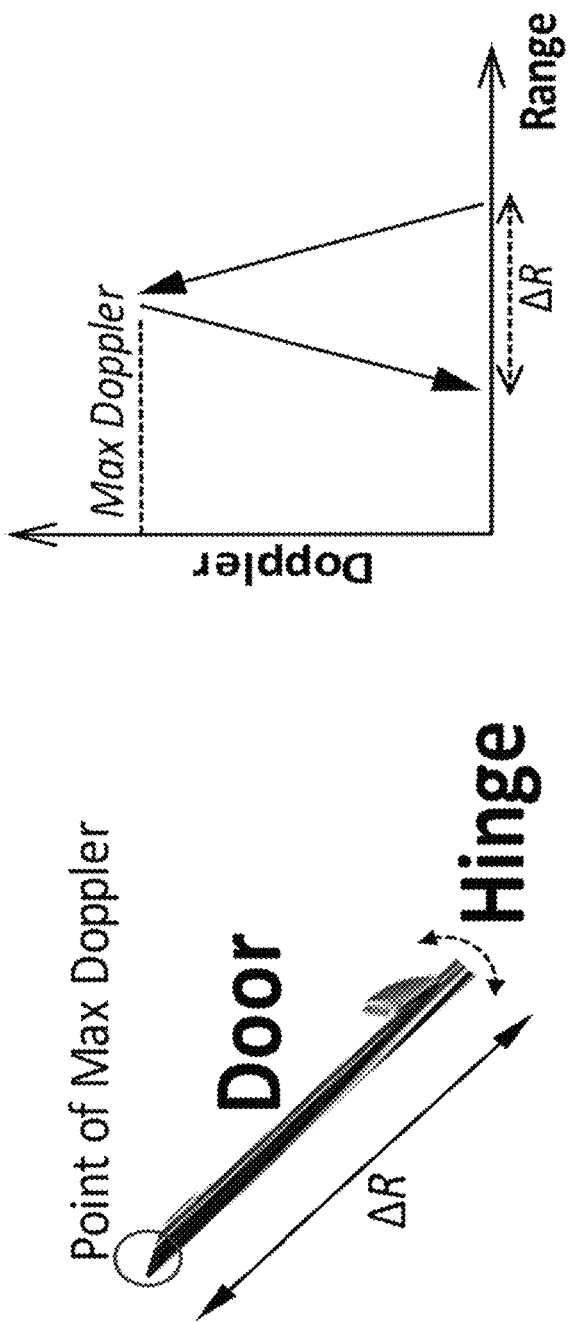

FIG. 22 is a plot illustrating the range-Doppler map of the received radar waveform in accordance with an embodiment of the present disclosure; and FIG. 23 shows diagrams illustrating that the change in range corresponds to the length ΔR of the door and that the point of maximum Doppler corresponds to the velocity of the scatterer on the door at the point furthest from the hinge of rotation in accordance with an embodiment of the present disclosure.

Features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

In the following description, numerous specific details are set forth to provide a thorough understanding of the disclosure. However, it will be apparent to those skilled in the art that the disclosure, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to understand that such description(s) can affect such feature, structure, or characteristic in connection with other embodiments whether or not explicitly described.

1. Overview

Embodiments of the present disclosure overcome contemporary challenges using an approach extending SAR motion compensation techniques to solve the difficult problem of vibration analysis and sound reproduction at MMW. In an embodiment, a 94 GHz pulse-Doppler linear frequency modulation (LFM) radar operating at an outdoor test range is used to interrogate a moving acoustic source, and the complex data set is coherently processed using a selection of motion compensation techniques adapted from SAR to remove the effects of linear and nonlinear target motion so that the range-Doppler map retains only vibration information in the Doppler dimension. Vibration and sound waveforms can thus be selectively reproduced at specific ranges directly from the radar baseband waveform, without the need for additional complex analysis or audio processing. These results significantly expand the applications of radar vibrometry, eliminating the present limitations due to target motion.

Embodiments of the present disclosure include a MMW pulse-Doppler radar for the remote sensing of acoustic vibration for targets in motion. Embodiments of the present disclosure use precision motion compensation for MMW vibrometry, making it possible for a monostatic radar to extract and reproduce small-scale vibrations on platforms undergoing large-scale motion. The motion compensation methodologies of embodiments of the present disclosure use a hierarchical approach combining direct and indirect estimation for the time dependent variation of target motion parameters across coherent samples in radar fast time and slow time. Additionally, the wide bandwidth commonly available at MMW allows vibrations to be selectively detected and disambiguated in range across the length of moving targets. In an embodiment, stretch processing compresses the received radar bandwidth by more than 10×, so that Hilbert sampling can be used to acquire quadrature samples using a single analog-to-digital converter. In an embodiment, the resulting complex baseband response directly reproduces the target's acoustic signature. In an embodiment, a 94 GHz pulsed linear frequency modulated (LFM) radar accurately reproduces the pitch of audio waveforms generated by a speaker in the rear of an accelerating automobile at an outdoor test range.

2. Exemplary Systems with Vibrating Targets

Figure 1:
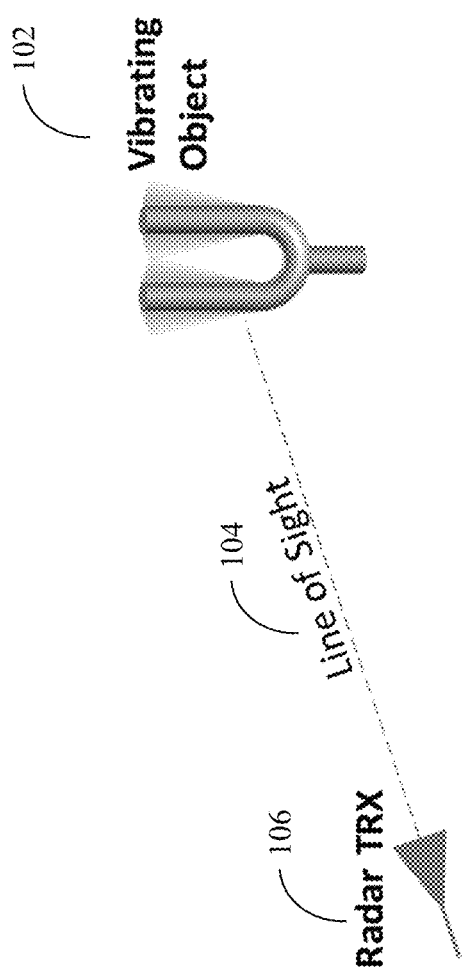
FIG. 1 is a diagram illustrating a stationary but vibrating target observed by a radar transceiver (TRX) along a line of sight in accordance with an embodiment of the present disclosure.

In an embodiment, the round trip phase delay between a radar and its target is $e^{j4\pi r/\lambda}$, where r is the instantaneous range, and λ is the radar wavelength. Target vibration in range modulates this phase delay, allowing the radar to act as a remote vibration transducer. FIG. 1 is a diagram illustrating a stationary but vibrating target 102 observed by a radar transceiver (TRX) 106 along a line of sight 104 in accordance with an embodiment of the present disclosure. In an embodiment, target vibration along light of sight 104 modulates the phase delay of the backscattered signal. In an embodiment, target 102 can be approximated as a point scatterer vibrating sinusoidally at a rate $f_v$ with peak vector displacement $\overline{D}_v$. In an embodiment, the maximum target deflection observed by the radar is $\Delta r = \overline{u}_r \cdot \overline{D}_v$, where $\overline{u}_r$ is the unit vector along the radar line of sight 104. In an embodiment, the target's peak sinusoidal vibration in range Δr modulates the round trip phase delay $e^{j4\pi r/\lambda}$ of the radar return so that the complex baseband envelope of the received signal can be expressed as a function of time t as:

$$\tilde{s}_{RX}(t) = A_c e^{j\frac{4\pi}{\lambda}\Delta r \sin(2\pi f_v t)} \quad (1)$$

where $A_c$ is the received carrier amplitude. From classical analog communication theory, the sinusoidally modulated phase delay of Equation (1) can be decomposed into Bessel harmonics so that:

$$\tilde{s}_{RX}(t) = A_c \sum_{n=-\infty}^{\infty} J_n\left(\frac{4\pi}{\lambda}\Delta r\right) e^{2\pi n f_v t} \quad (2)$$

where $J_n(.)$ is a Bessel function of the first kind of order n. The received waveform thus includes an infinite series of positive and negative harmonics spaced $f_v$ apart around the carrier.

Figure 2:
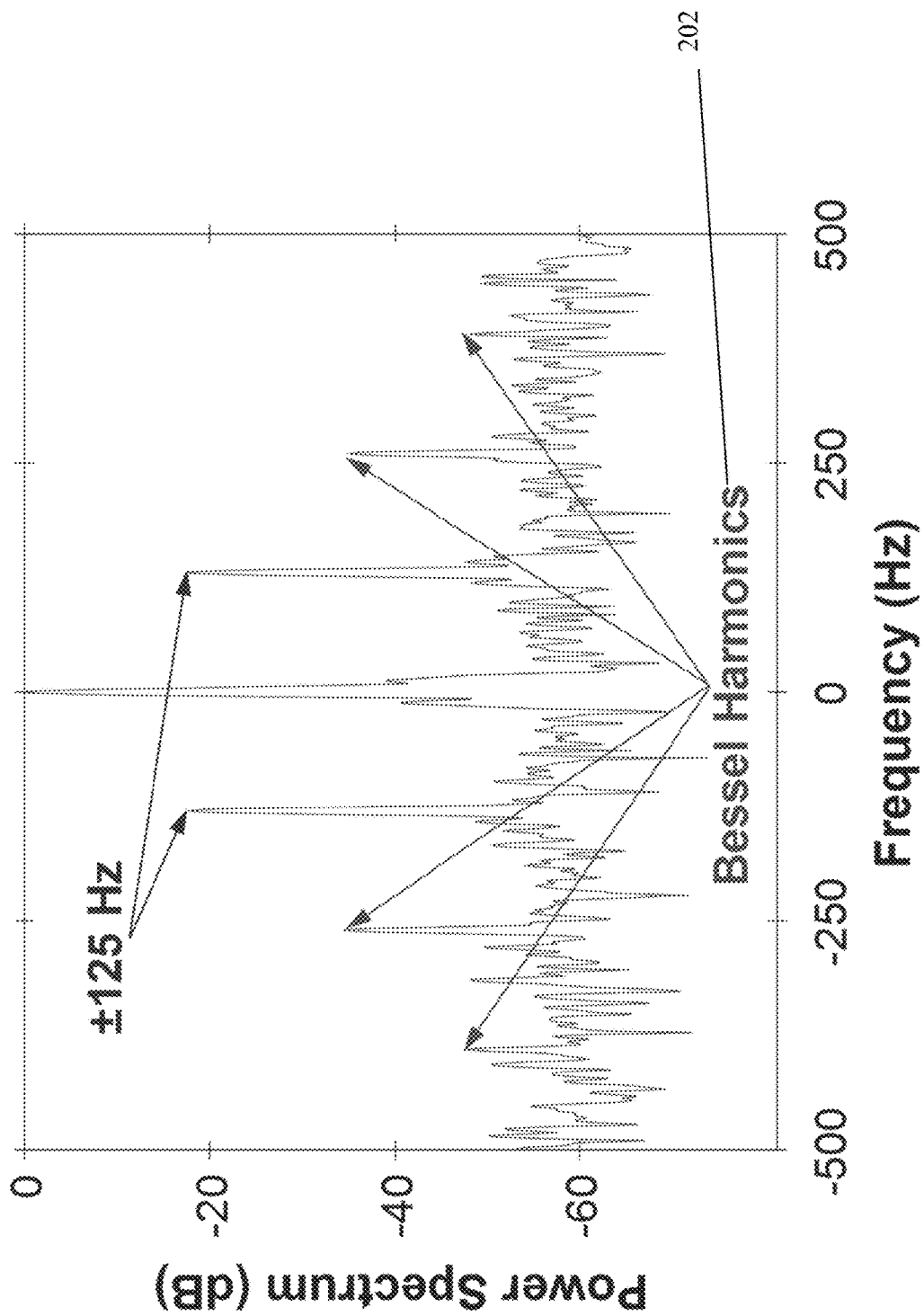
FIG. 2 is a diagram showing Bessel harmonics observed from a stationary tuning fork vibrating at 125 Hz in accordance with an embodiment of the present disclosure.

FIG. 2 is a diagram showing Bessel harmonics observed from a stationary tuning fork vibrating at 125 Hz in accordance with an embodiment of the present disclosure. FIG. 2 uses a MMW radar system in accordance with an embodiment of the present disclosure to observe a stationary vibrating 125 Hz tuning fork at a range of 5.1 m. The baseband spectrum shows Bessel harmonics 202 spaced at 125 Hz.

Figure 3:
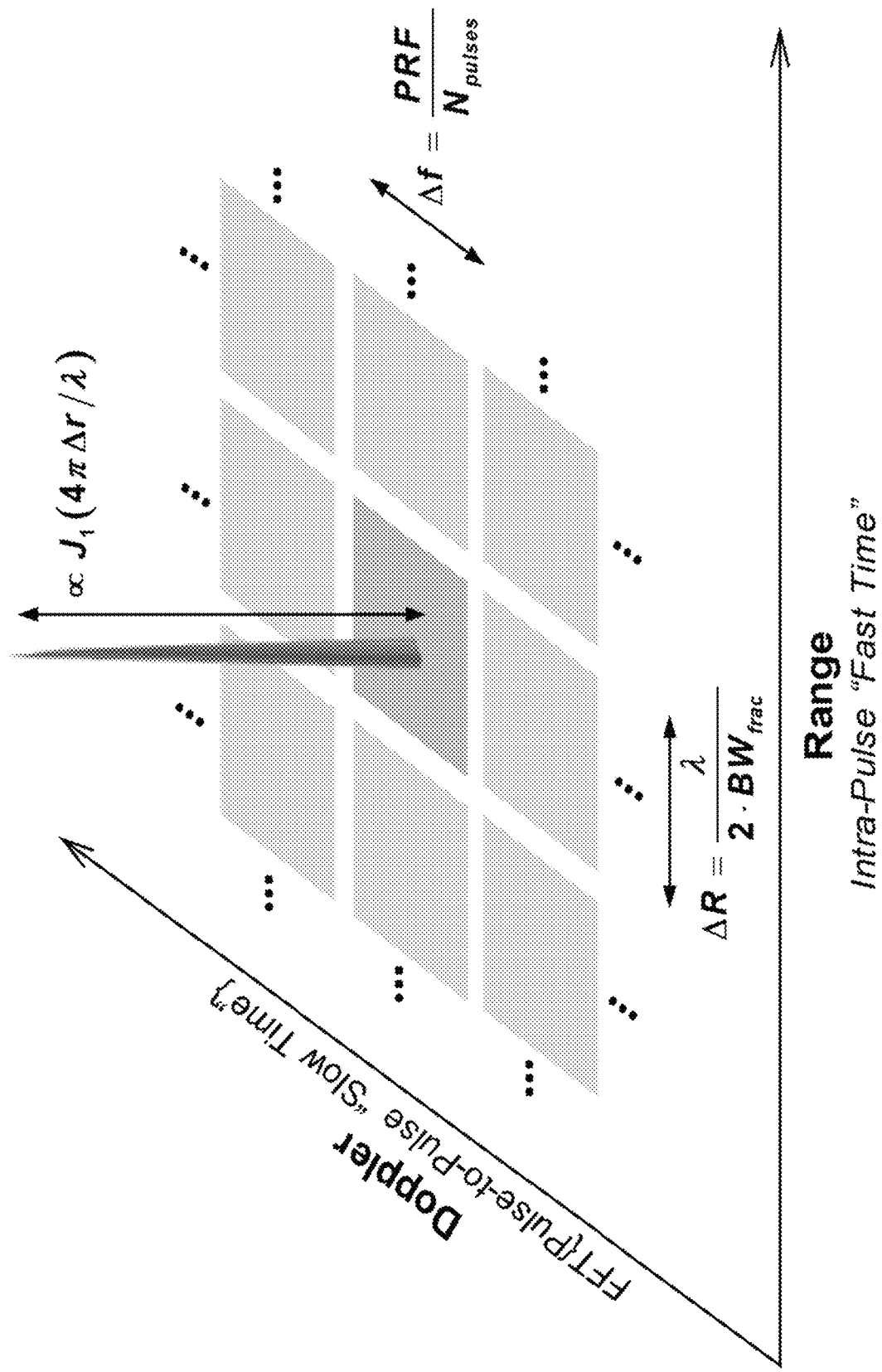
FIG. 3 is a diagram showing a harmonic of vibration observed in range-Doppler space in accordance with an embodiment of the present disclosure.

The advantages of MMW pulse Doppler radar for vibrometry can be demonstrated using an analysis of sinusoidal vibration in range-Doppler space. FIG. 3 is a diagram showing a harmonic of vibration observed in range-Doppler space in accordance with an embodiment of the present disclosure. In FIG. 3, the range dimension provides a record of target reflectivity within the time span of individual pulses (i.e., radar "fast time"). The Doppler dimension corresponds to the Fast Fourier Transform (FFT) across pulses at specific range delay (i.e., an FFT across radar "slow time"). Vibration information is discretized to range-Doppler cells of size $\Delta R \cdot \Delta f$.

As shown in FIG. 3, the received "fast time" samples recorded within each radar pulse represent the target return vs. range, with range resolution $\Delta R = \lambda/(2 \cdot BW_{frac})$, where $BW_{frac}$ is the radar's fractional bandwidth. The FFT across radar samples recorded at a specific range delay represents the "slow time" Doppler spectral response at that range. Doppler resolution is $\Delta f = PRF/N_{pulses}$, where PRF is the pulse repetition frequency, and $N_{pulses}$ is the number of pulses observed. The total noise power per range-Doppler cell is proportional to the cell size $\Delta R \cdot \Delta f$, and the amplitude of the strongest baseband harmonic of vibration is proportional to $J_1(4\pi\Delta r/\lambda)$. Since both the signal strength and noise power are functions of frequency/wavelength, MMW operation can significantly enhance sensitivity to acoustic vibration. For example, for a 25.4-μm vibration observed with 10% fractional bandwidth, increasing the carrier frequency from 1 GHz to 100 GHz increases SNR by 24 dB. Beyond sensitivity, improved range resolution $\Delta R$ is an additional advantage to performing vibrometry at MMW. For Doppler radars operating CW or with large $\Delta R$, multiple sources of vibration within a scene or along an extended target must superimpose upon one another; separating superimposed audio signals is computationally challenging and a long-standing subject of research. With the improved range resolution available at MMW, individual sources of vibration can be localized in range.

Figure 4:
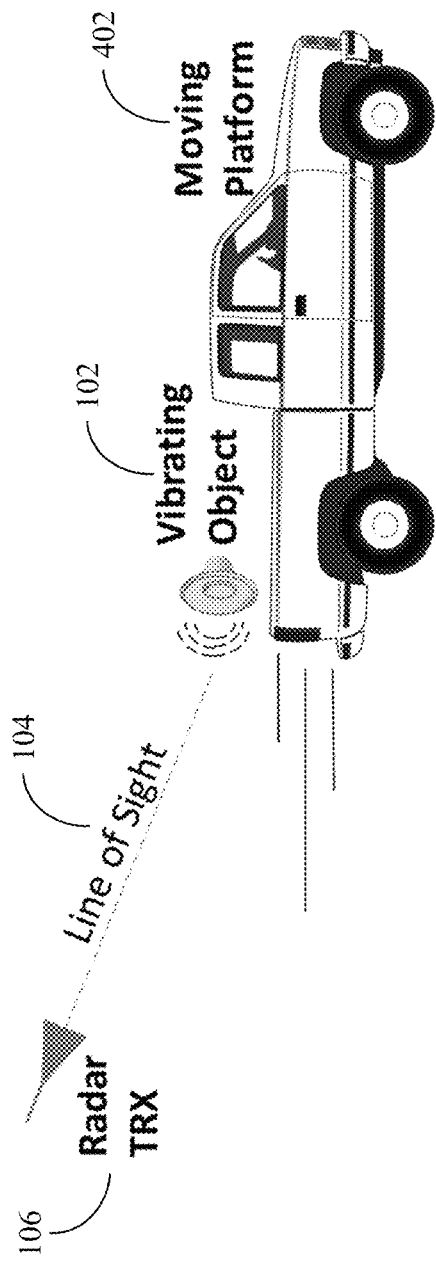
FIG. 4 shows a moving platform, including a source of vibration, observed by radar transceiver in accordance with an embodiment of the present disclosure.

Despite these advantages, the issue of platform motion constitutes a major technical challenge at MMW. FIG. 4 shows a moving platform 402, including a source of vibration, observed by radar transceiver 106 in accordance with an embodiment of the present disclosure. In FIG. 4, the vibration-induced phase modulation is superimposed upon the time-dependent range displacement and phase delay produced by the platform motion. For each received pulse, the radar return vs. range, or "pulse profile", can be approximated as:

$$s_{RX}(m) = \sum_m \rho_m \delta(m \cdot \Delta R - r_m) e^{j\frac{4\pi}{\lambda}(r_m + \Delta r_m \sin(2\pi f_{v,m} t))} \quad (3)$$

where for the $m^{th}$ range cell: $r^m$ is the range, $\Delta r_m$ the peak vibration along the radar line of sight, $f_{v,m}$ is the vibration rate, and $\rho_m$ is the complex reflectivity. For a moving target, $r_m$ can be expressed as a function of time:

$$r_m(t) = r_{o,m} + [\overline{v}(t)t + \overline{v}(t)t^2] \cdot \overline{u}_r \quad (4)$$

where $r_{o,m}$ is the starting range and $\overline{v}(t)$, $\overline{v}(t)$ are the platform's velocity and acceleration, respectively.

In an embodiment, motion makes the range to individual scatterers dependent on time. In an embodiment, $r_m(t)$ represents the effect of platform motion. In an embodiment, the first instance of $r_m(t)$ in Equation (3) represents the effect of bulk target motion on the reflected amplitude/range, and the second instance of $r_m(t)$ in Equation (3) represents the effect of bulk target motion on the reflected phase. In an embodiment, $\Delta r_m$ in Equation (3) represents peak sinusoidal vibration and a desired signature.

The effect of platform motion $r_m(t)$ dislocates both the position in range $\delta(m \cdot \Delta R - r_m)$ and the phase response $e^{j4\pi r_m/\lambda}$ vs. time. Extracting the instantaneous frequency $f_{v,m}$ of a small-scale vibration requires compensation for these effects in both range and phase. Since the phase term in Equation (3) is at the wavelength scale, motion compensation can be especially challenging at MMW. Systems and methods using hierarchical motion compensation approaches according to embodiments of the present disclosure meet this challenge to achieve highly accurate MMW measurement of vibration on moving platforms.

3. Exemplary Motion Compensation

In an embodiment, motion compensation in radar processing can be accomplished by: (1) a direct (i.e., measurement driven) estimate of target motion effects identifying and tracking features of the received data changing in fast time and/or slow time; (2) an indirect (i.e., optimization driven) estimate based on the minimization of a cost function; or (3) direct estimate of target motion in range and a direct or indirect estimate of target motion in phase.

Embodiments of the present disclosure use a hierarchical approach blending direct and indirect estimation in both range and phase to provide adequate motion compensation for MMW data sets within a computationally reasonable framework. In an embodiment, motion compensation in range, or "range alignment," operates in fast time, beginning with a coarse direct estimate for the target motion parameters, followed by an indirect estimate for the same parameters based on entropy optimization. In an embodiment, this is followed by motion compensation in phase, or "phase compensation," which operates in slow time on the range-aligned data set, beginning with an indirect estimate for quadratic phase error based on entropy optimization followed by a measurement-driven phase gradient autofocus (PGA) process to account for higher-order phase errors. In an embodiment, techniques specialized for airborne operation (e.g., keystone processing, range migration algorithms, and polar format processing, etc.) are not required for analysis of the experimental data used in this disclosure and are therefore not considered.

In an embodiment, to constrain the computational resources required, motion compensation is performed over finite intervals/frames of consideration that can be concatenated for subsequent analysis or extended reproduction. For the automotive targets used in this demonstration, is motion compensation intervals provide good results.

Figure 5A:
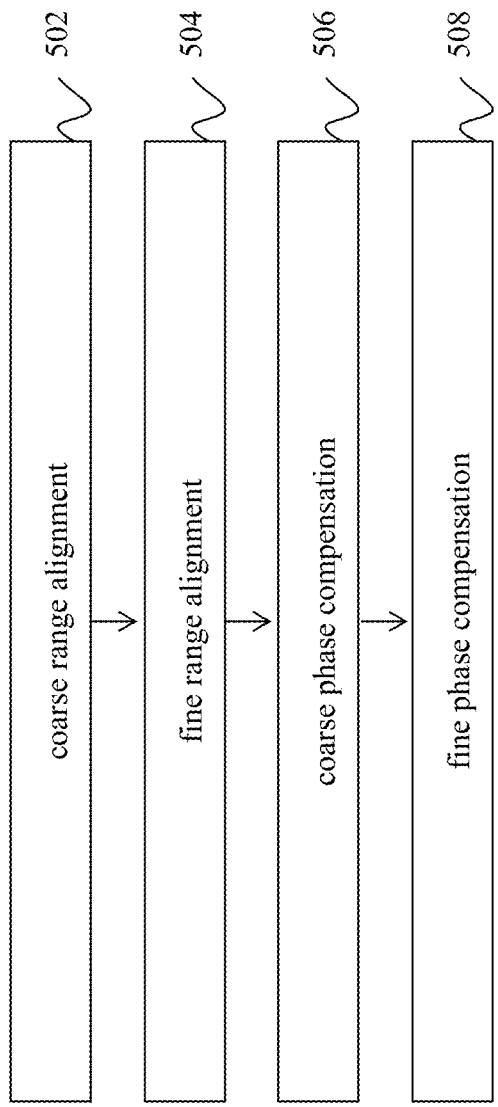
FIG. 5A is a flowchart illustrating an exemplary motion compensation method in accordance with an embodiment of the present disclosure.

FIG. 5A is a flowchart illustrating an exemplary motion compensation method in accordance with an embodiment of the present disclosure. In step 502, coarse range alignment is performed. In an embodiment, coarse range alignment is provided by direct pulse-by-pulse estimation of the time shifts required. In step 504, fine range alignment is performed. In an embodiment, fine range alignment is provided by entropy optimization and a nonlinear motion model. In step 506, coarse phase compensation is performed. In an embodiment, coarse phase compensation is provided by entropy optimization of quadratic phase error and a nonlinear motion model. In step 508, fine phase compensation is performed. In an embodiment, fine phase compensation is provided by phase gradient autofocus (e.g., direct estimation technique) and can account for higher order nonlinearities outside the motion model.

Figure 5B:
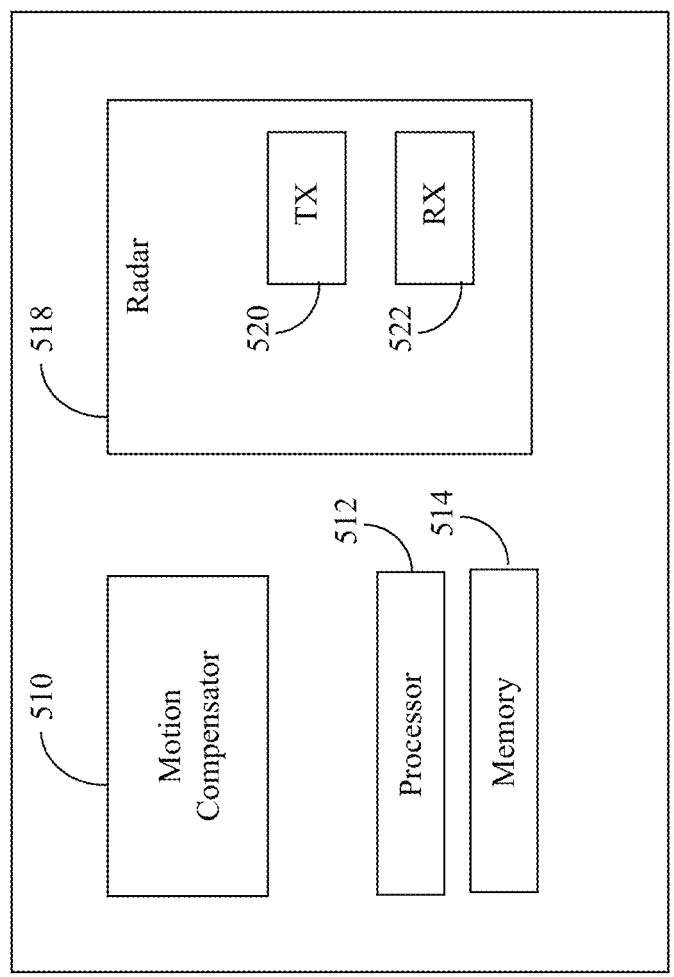
FIG. 5B is a diagram of an exemplary radar system with motion compensation in accordance with an embodiment of the present disclosure.

FIG. 5B is a diagram of an exemplary radar system with motion compensation in accordance with an embodiment of the present disclosure. In an embodiment, the system of FIG. 5B includes a motion compensator 510 and a radar 518 (e.g., a MMW radar), which includes a transmitter 520 and a receiver 522. In an embodiment, the system of FIG. 5B also optionally includes a processor 512 and/or a memory 514. In an embodiment, processor 512 and/or memory 514 can be implemented as part of motion compensator 510 and/or radar 518. In an embodiment, motion compensator 510 can be implemented as part of radar 518.

The system of FIG. 5B can be implemented using hardware, software, and/or a combination of hardware and software in accordance with embodiments of the present disclosure. The system of FIG. 5B can be implemented using a single device or multiple devices in accordance with embodiments of the present disclosure. In an embodiment, motion compensator 510 is implemented using hardware components (e.g., and is integrated into radar 518). In an embodiment, motion compensator 510 is implemented using software (and can be integrated into radar 518 or integrated into a system coupled to, or accessible by, radar 518). In an embodiment, motion compensator 510 receives signals from radar 518 and performs signal processing for radar 518. For example, in an embodiment, radar 518 interrogates a moving source and transmits the resulting data to motion compensator 510 for processing to remove the effects of linear and nonlinear target motion.

4. Exemplary Range Alignment

Figure 6:
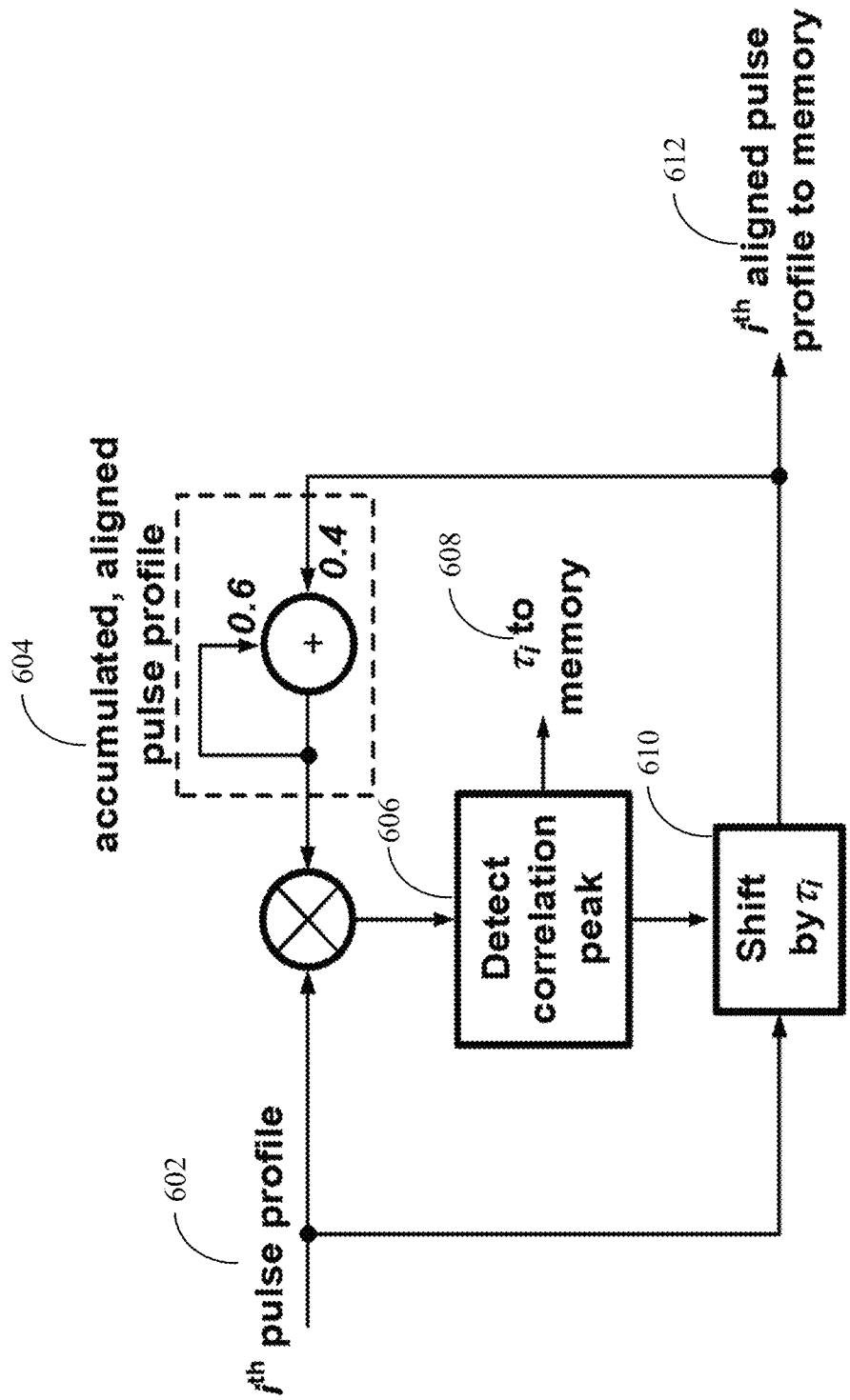
FIG. 6 is a diagram showing a coarse stage of range alignment provided by direct pulse-by-pulse estimation of the time shifts required in accordance with an embodiment of the present disclosure.

In an embodiment, the range alignment process is important at MMW to provide an acceptable initial condition for standard phase compensation techniques to operate effectively. FIG. 6 is a diagram showing a coarse stage of range alignment provided by direct pulse-by-pulse estimation of the time shifts required in accordance with an embodiment of the present disclosure. In FIG. 6, each pulse profile is correlated with a composite of all previous pulses, and the offset of the correlation peak from 0 s indicates the time shift needed to align that pulse. Discrete time processing is implicit in the diagram of FIG. 6.

In FIG. 6, the range alignment process begins with a pulse-by-pulse search for the time delay $\tau_i$ that maximizes the correlation between the $i^{th}$ pulse profile 602 and a reference pulse. In FIG. 6, the $i^{th}$ pulse profile 602 is combined with an accumulated pulse profile 604 to detect a correlation peak 606. Based on correlation peak 606, the time delay $\tau_i$ recorded in memory 608, the respective pulse profile is shifted by $\tau_i$ 610, and the $i^{th}$ aligned pulse profile 612 is recorded in memory.

In an embodiment, to reduce the effect of target scintillation, the reference pulse used in this correlation is a composite of all prior pulse profiles, each shifted by its calculated delay, and accumulated in a recursive filter using a weighting coefficient of 0.4 for the most recent (i−1)th pulse and 0.6 for all previous pulses. Fitting a $2^{nd}$ order polynomial to the resulting delay vector $\bar{\tau}$ provides an estimate of a constant velocity $v_r = \bar{v} \cdot \bar{u}_r$ and acceleration $\dot{v}_r = \bar{\dot{v}} \cdot \bar{u}_r$ along the radar line of sight over the interval of consideration.

In an embodiment, using this procedure, the error in the range alignment across pulses is ideally <0.5 ΔR. In an embodiment, to further refine this estimate, the aligned return from every $8^{th}$ pulse is time shifted according to the motion model defined by the directly obtained estimates for $v_r$ and $\dot{v}_r$; the selected pulses are then summed into accumulated pulse profile 604. In an embodiment, calculating the 1-D entropy of accumulated pulse profile 604 provides a measure of its sharpness, with minimum entropy corresponding to maximum sharpness. In an embodiment, optimizing $v_r$ and then $\dot{v}_r$ to minimize entropy provides an updated estimate for their values; this entropy optimization is then iterated on an updated accumulated pulse profile until a stable solution for $v_r$ and then $\dot{v}_r$ reached. In an embodiment, the complete data set is then aligned in range based on the final values for $v_r$ and $\dot{v}_r$.

In an embodiment, throughout the range alignment process, time shifting is accomplished by converting the pulse profile to the frequency domain (i.e., a fast time FFT for each pulse), multiplying by a phase ramp $e^{-j2\pi f \tau_i}$ corresponding to the time delay, and then performing an inverse FFT. This method allows sub-range bin shifts in the data.

5. Exemplary Phase Compensation

In an embodiment, the range alignment procedure described above manipulates the fast time pulse profiles and therefore operates at the range resolution scale ΔR rather than the wavelength scale λ. Thus, although range alignment can compensate effectively for the amplitude distortion term δ[m·ΔR−$r_m(t)$] in Equation (3), significant errors remain in the phase response $e^{j4\pi r_m(t)/\lambda}$. Embodiments of the present disclosure provide a multistage phase compensation process that can correct for these errors. In an embodiment, as a first step, the range aligned data set is converted to a range-Doppler map, such as illustrated in FIG. 3, by applying an FFT across the slow time dimension. In an embodiment, a quadratic phase of:

$$\varphi_n = \alpha \cdot \left(n - \frac{N_{pulses}}{2}\right)^2, n = 0 \ldots N_{pulses} \quad (5)$$

is applied across the Doppler dimension where α is a scale factor. In an embodiment, optimizing α over 40 iterations to minimize the two dimensional (2D) entropy of the range-Doppler map eliminates gross quadratic phase errors.

In an embodiment, after applying this correction, phase gradient autofocus (PGA) is used to further refine the phase error estimate based on a measurement of the differential phase error across a selection of prominent scatterers in range-Doppler space. PGA is a direct estimation technique operating on the measured data that, unlike the prior motion compensation steps, is unconstrained by any particular motion model and can compensate for residual higher order phase errors, including errors due to distributed scattering from the target's underlying structure. In an embodiment, the results herein use five iterations of PGA to correct for residual phase error in range-Doppler maps processed over each 1 s frame of target motion.

6. Exemplary Radar System

Figure 7:
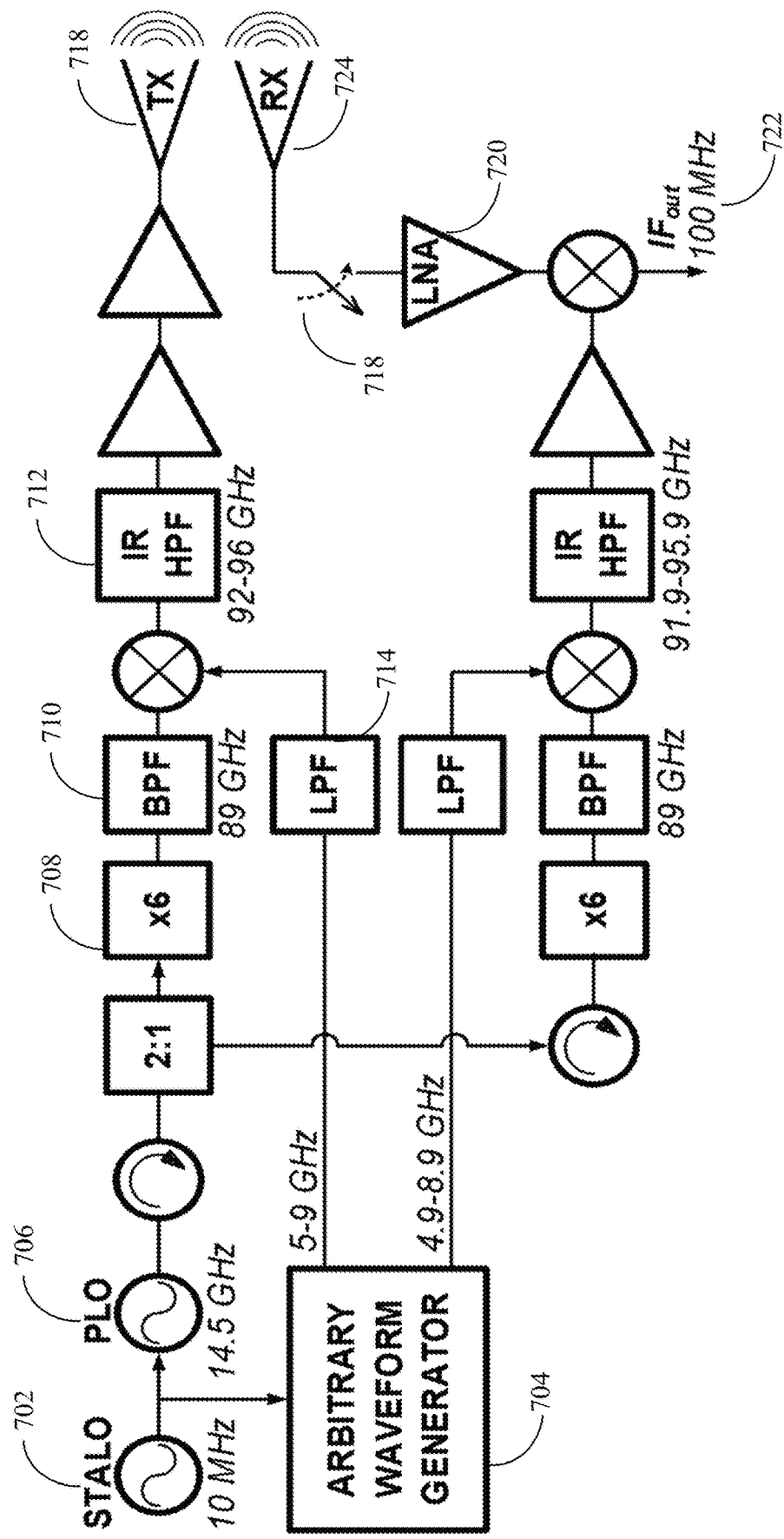
FIG. 7 is a diagram of a MMW pulse-Doppler radar system in accordance with an embodiment of the present disclosure.

In an embodiment, to demonstrate the proposed approach, an acoustic source on a moving platform is interrogated at an outdoor MMW test range. FIG. 7 is a diagram of a MMW pulse-Doppler radar system in accordance with an embodiment of the present disclosure. In an embodiment, FIG. 7 includes a transmitter (TX) 718 that outputs a linear frequency modulation (LFM) pulse of 4 GHz bandwidth, with an average transmit power of 80 mW. In an embodiment, FIG. 7 includes a receiver (RX) 724 that is a 7.5-dB-noise-figure receiver that deramps the received pulse to an intermediate frequency (IF) center frequency of 100 MHz.

In an embodiment, the radar of FIG. 7 is a 94 GHz pulse-Doppler radar. In an embodiment, the 4 GHz bandwidth and 80 mW average transmit power of radar system of FIG. 7 are within the permissible performance envelope of commercial W band automotive radar but with enhanced flexibility for customized digital processing and extended memory length when compared with off-the-shelf short range MMW radar systems.

In an embodiment, excluding the Tektronix 70002A arbitrary waveform generator (AWG) 704 and 10 MHz rubidium stable local oscillator (STALO) 702, the radar system of FIG. 7 is built using WR-10 rectangular waveguide and coaxial connectorized components, with a total volume of 440 cm$^3$ and power dissipation of 22 W. As illustrated in FIG. 7, STALO 702 provides a timing reference to AWG 704 and phase locked oscillator (PLO) 706. The PLO output at 14.5 GHz splits between the TX 718 and RX 724 and separately multiplies 6× to 89 GHz in both to maintain high TX to RX isolation.

In an embodiment, a 6× multiply stage 708 has sufficient gain to allow the 89 GHz tone to upconvert a 4-GHz-bandwidth LFM pulse from AWG 704 to the 92-96 GHz range, using an image reject (IR) high pass filter (HPF) 712, bandpass filter (BPF) 710, and low pass filter (LPF) 714 to suppress undesired frequency content. In an embodiment, the pulse width is 100 µs, and the PRF is 4 kHz. In an embodiment, the peak transmit power within the pulse is 200 mW.

In an embodiment, both TX and RX antennas are vertically polarized with an 11° beam width and 23 dB gain. A front end switch protects a low noise amplifier (LNA) 720 during the transmit pulse. In an embodiment, The RX 724 achieves an overall noise figure of 7.5 dB. In an embodiment, the RX frequency conversion plan that mirrors the TX to downconvert and "deramp" the received 92-96 LFM pulse to an IF center frequency of 100 MHz. This deramping approach, also known as "stretch processing," collapses the radar bandwidth to effectively implement pulse compression in the analog domain by multiplying the two offset frequency ramps in the receiver. In an embodiment, an IF bandwidth of 9 MHz defines a usable range swath of 20 m that matches the length of the test range. In an embodiment, the IF output 722 of FIG. 7 is digitized by a digitizer (e.g., a Spectrum Instrumentation Corporation DN2.225-08 NETBOX 8-bit digitizer) at a sample rate of 312.5 MHz and maximum record length of approximately 4 s. In an embodiment, complex (i.e., quadrature or digital IQ) samples are generated digitally using Hilbert sampling to eliminate the need for the quadrature ADCs and IQ calibration typically used in radar vibrometry. In an embodiment, coherent processing over 4096 pulses provides 36 dB processing gain to a calibration target.

In an embodiment, FIG. 4 shows the moving platform 402 and acoustic source (e.g., vibrating object 102) used in this demonstration. In an embodiment, moving platform 402 is a 2006 Infiniti FX35 measuring 4.8×1.9×1.7 m accelerates from a stop to a typical value of 3.5 m/s (10 mph) over the test range's 20 m swath. In an embodiment, vibrating object 102 is a Harmon Infinity Primus C-25 speaker mounted in the open cargo area operates at its initial/default 23 dB volume. In an embodiment, the peak sinusoidal displacement, measured using an MTI Instruments Microtrak 4 laser vibrometer, is uniform along the surface of the speaker cone, monotonically decreasing in amplitude from 120 µm at 100 Hz to 8 µm at 500 Hz. In an embodiment, this acoustic range corresponds to the range of audio stimuli used in the experimental demonstration of the following section.

7. Exemplary Experimental Results

In the first test run, the speaker is mounted in the automobile's open cargo area, vibrating at 150 Hz with a peak sinusoidal displacement of 105 µm. While illuminated by the MMW pulse Doppler radar, the vehicle traverses the 20 m test range under human control with an initial velocity of 0.5 m/s and acceleration of 1.1 m/s$^2$ and an initial distance of 1.6 m. The range waterfall plot shown in FIG. 8 illustrates the progression in time of radar's received signal to noise ratio (SNR) vs. range delay, without the application of motion compensation processing.

Figure 8:
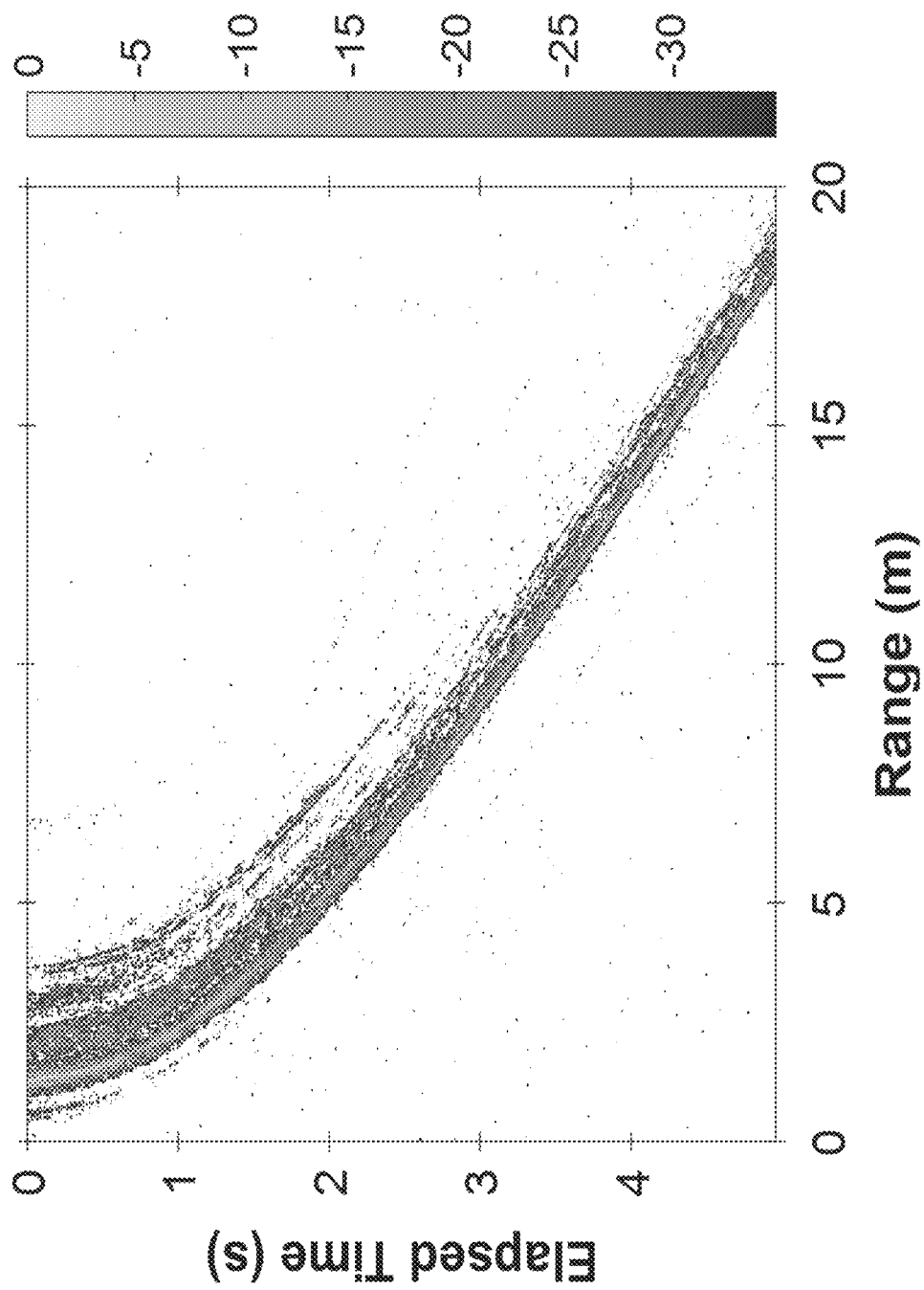
FIG. 8 shows a range waterfall plot illustrating received SNR vs. elapsed time and range for the automobile traversing the 20 m test range in accordance with an embodiment of the present disclosure.

FIG. 8 shows a range waterfall plot illustrating received SNR vs. elapsed time and range for the automobile traversing the 20 m test range in accordance with an embodiment of the present disclosure. The speaker shown in FIG. 7 is vibrating at 150 Hz with a peak sinusoidal displacement of 105 µm.

Figure 9:
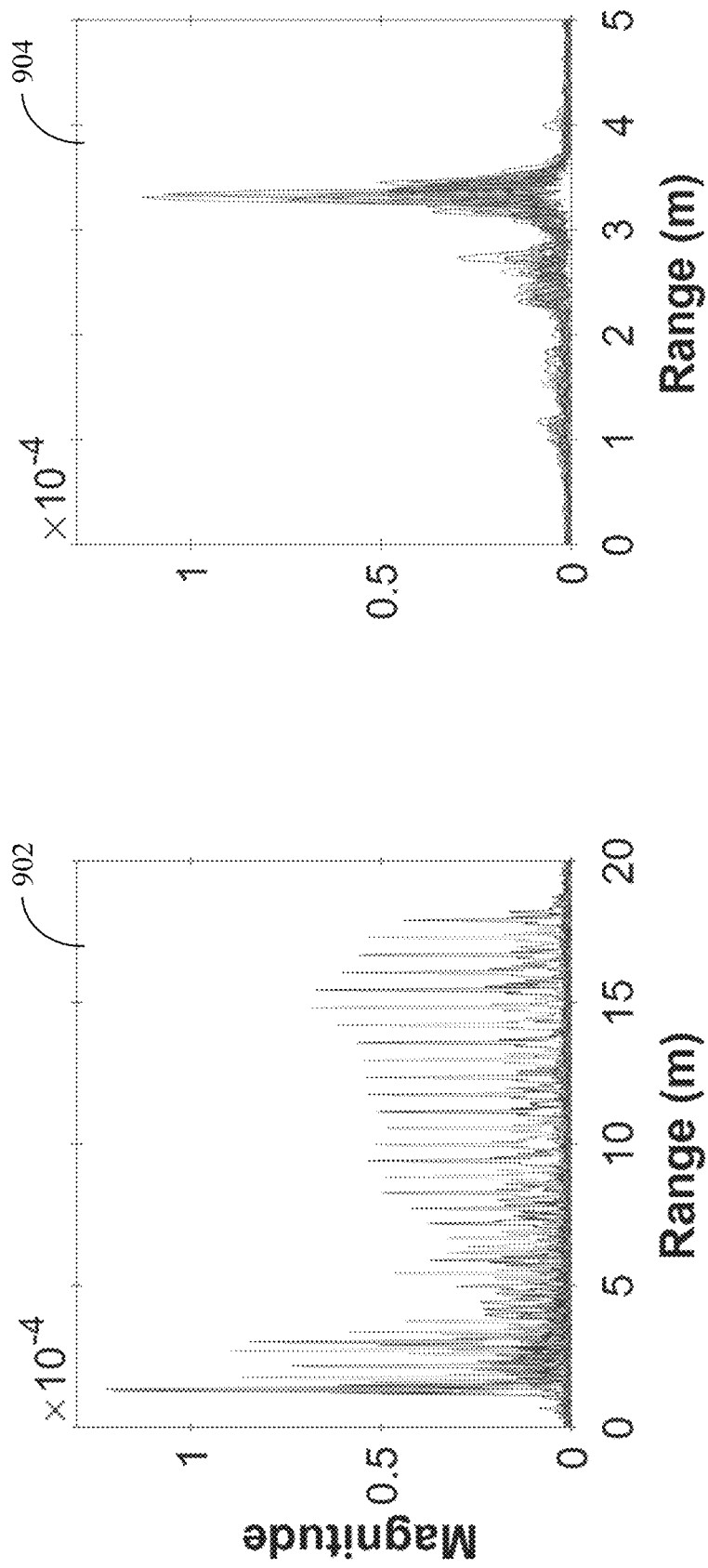
FIG. 9 shows pulse profiles vs. range for every 512 pulses from FIG. 8 before and after the range alignment process in accordance with an embodiment of the present disclosure.

As described above, in an embodiment, the first step in compensating for the target's motion is a two-stage range alignment process operating in radar fast time. FIG. 9 shows pulse profiles vs. range for every 512 pulses from FIG. 8 before 902 and after 904 the range alignment process in accordance with an embodiment of the present disclosure. FIG. 9 shows the pulse profile vs. range before and after range alignment for every eighth received pulse.

Figure 10:
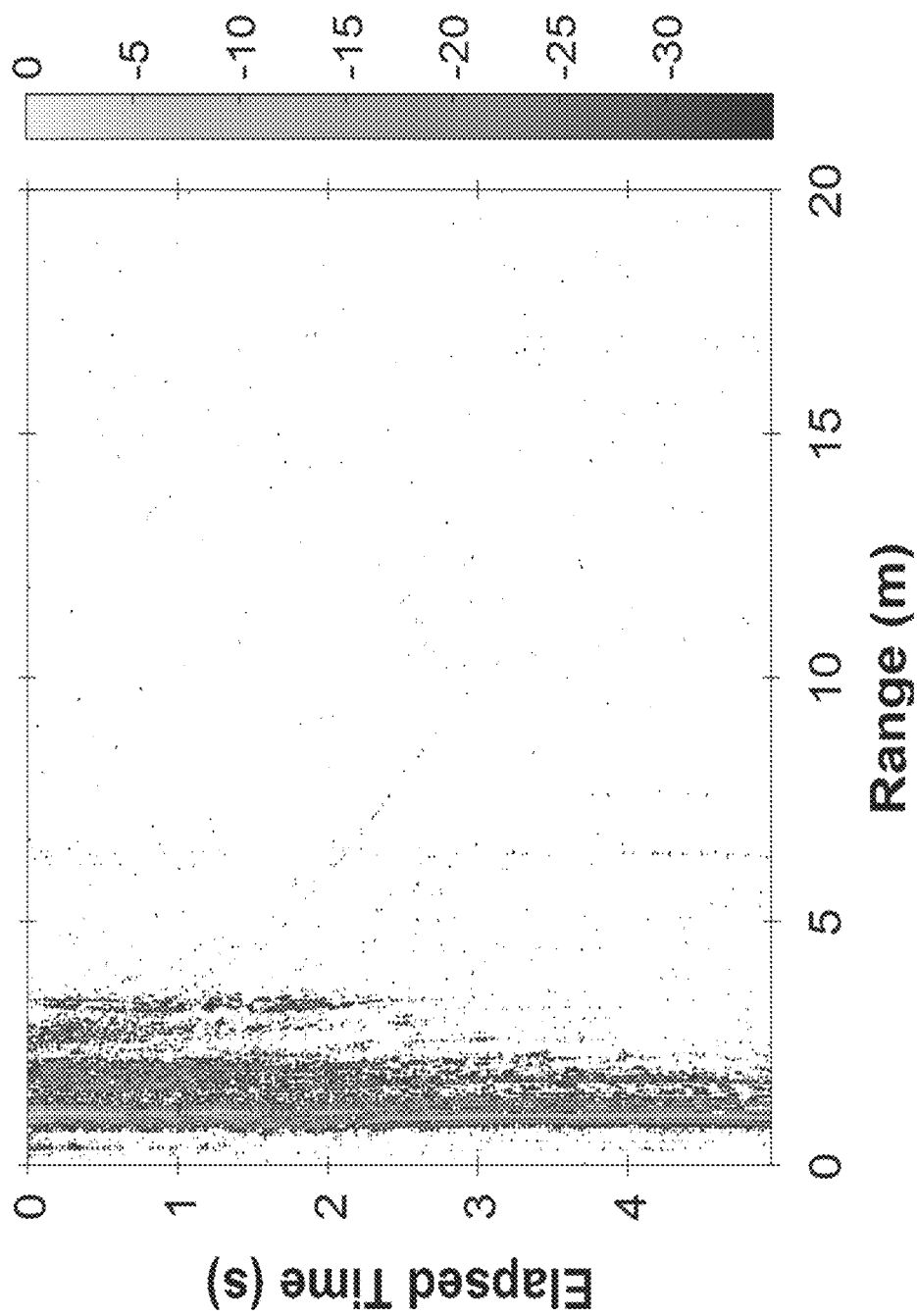
FIG. 10 shows the range waterfall plot of FIG. 8 after performing the full motion compensation process, including range alignment and phase compensation, in accordance with an embodiment of the present disclosure.

In an embodiment, the second step in motion compensation is a two-stage phase alignment process needed to remove phase errors in radar slow time. FIG. 10 shows the range waterfall plot of FIG. 8 after performing the full motion compensation process, including range alignment and phase compensation, in accordance with an embodiment of the present disclosure. The result indicates a stationary platform with decreasing SNR vs. elapsed time. FIG. 10 illustrates the resulting cascade of pulse profiles vs. radar slow time after application of range alignment and phase compensation. The motion compensated response vs. time appears effectively immobile, as if the target were a stationary platform at a fixed range whose SNR degrades over time.

Figure 11:
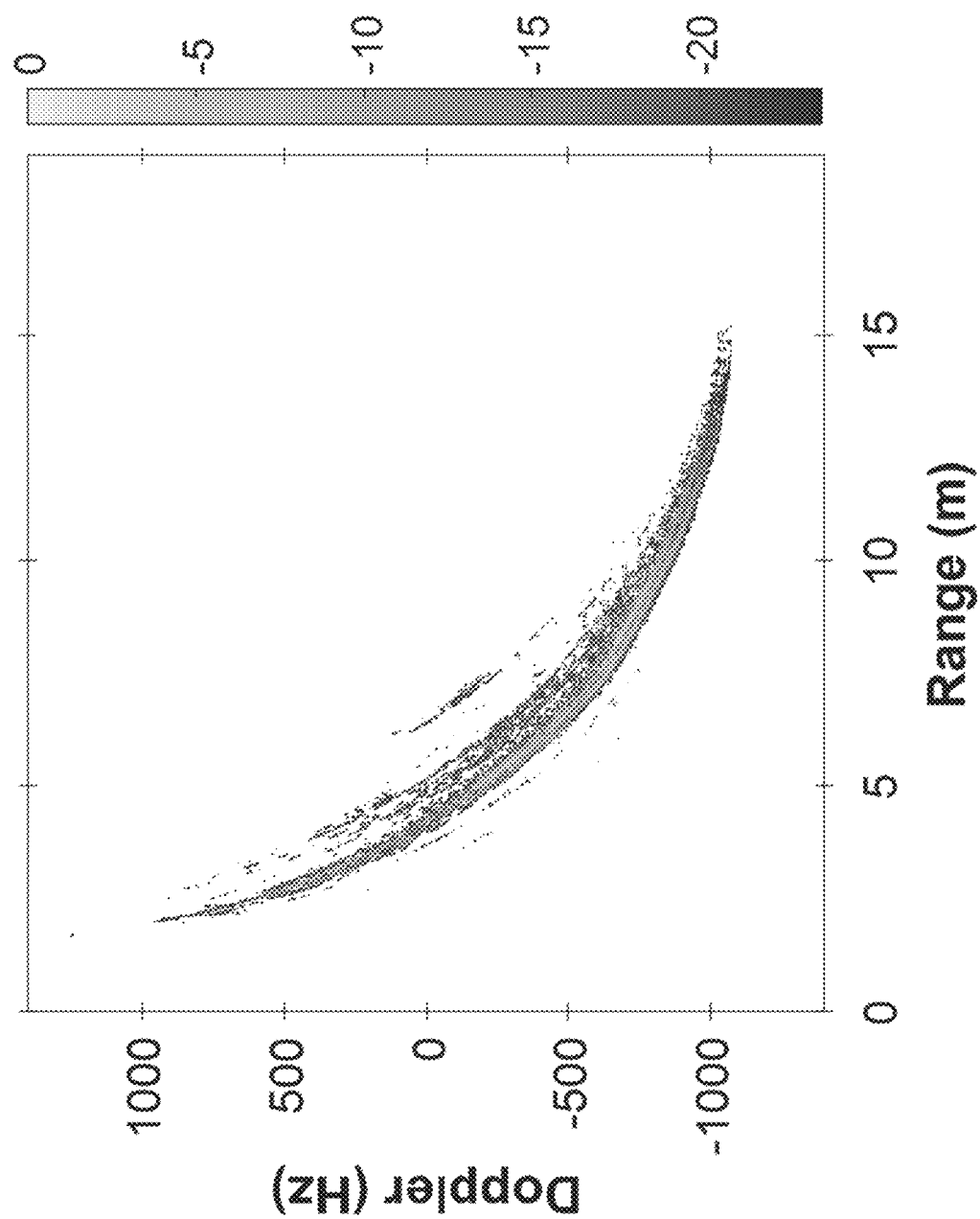
FIG. 11 shows the range-Doppler map for the radar data set shown in FIG. 8, without motion compensation applied, in accordance with an embodiment of the present disclosure.

Range-Doppler maps, as described above, provide a more meaningful tool than range waterfall plots for visualizing the target's acoustic signature. FIG. 11 shows the range-Doppler map for the radar data set shown in FIG. 8, without motion compensation applied, in accordance with an embodiment of the present disclosure. The response is centered at zero Doppler for convenience. FIG. 11 shows the range-Doppler map for the radar data set of FIG. 8, before the application of motion compensation; the acoustic signature is obscured by the target's large scale motion.

Figure 12:
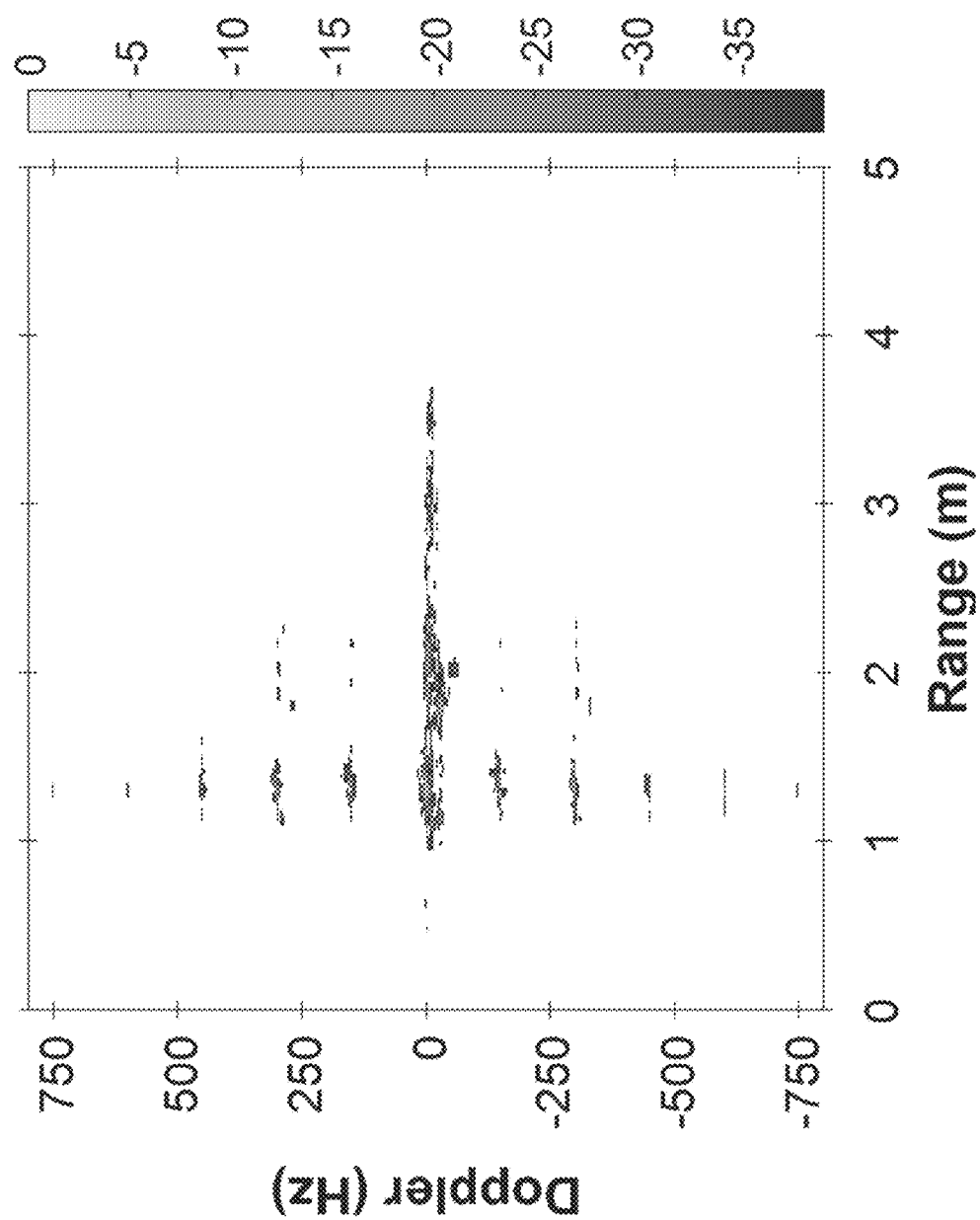
FIG. 12 shows the range-Doppler map of FIG. 11 after motion compensation in accordance with an embodiment of the present disclosure.

FIG. 12 shows the range-Doppler map of FIG. 11 after motion compensation in accordance with an embodiment of the present disclosure. Doppler harmonics show up clearly at 150 Hz intervals corresponding to the speaker's 150 Hz vibration. FIG. 12 shows the same data set after the application of motion compensation and zoomed in to a range extent corresponding to the size of the vehicle. In this case Doppler harmonics show up clearly at 150 Hz intervals corresponding to the 150 Hz tone transmitted by the speaker.

Figure 13:
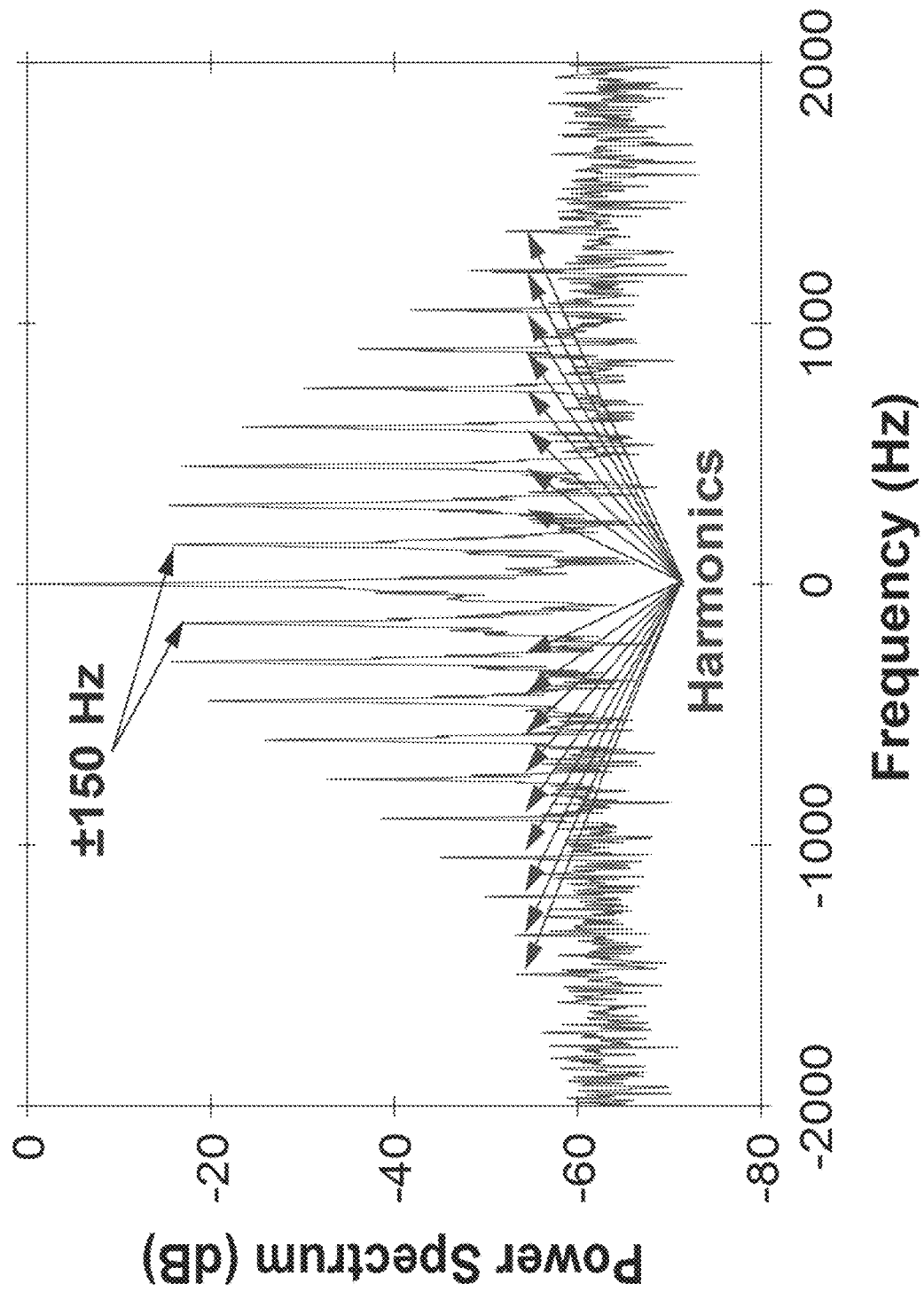
FIG. 13 is a diagram showing the magnitude of the complex power spectrum at the range of maximum Doppler variance from FIG. 12 in accordance with an embodiment of the present disclosure.

FIG. 13 is a diagram showing the magnitude of the complex power spectrum at the range of maximum Doppler variance from FIG. 12 in accordance with an embodiment of the present disclosure. FIG. 13 plots the magnitude of the radar's complex baseband power spectrum at the range of maximum Doppler variance. The 150 Hz tones and 18 higher order harmonics are consistent with the response of an ideal stationary phase modulator described above. The audio reconstructed from the baseband radar spectrum agrees well with the audio file transmitted from the moving speaker. Background acoustic noise (scaled by the relative radar reflectivity of the acoustic sources) is also apparent at the same range delay as the speaker. Importantly, this demonstration and all following results use no audio filtering or other baseband processing to intentionally enhance the received radar data.

Additional moving tests repeat the preceding scenario while incrementing the audio tone from 100 to 500 Hz in 50 Hz intervals for each experiment. After motion compensation, the baseband radar power spectrum shows a fundamental tone and associated harmonics at intervals corresponding to the speaker's vibration. A composite audio file based on received radar data from all nine experiments shows good agreement with the original acoustic transmission.

Figure 14:
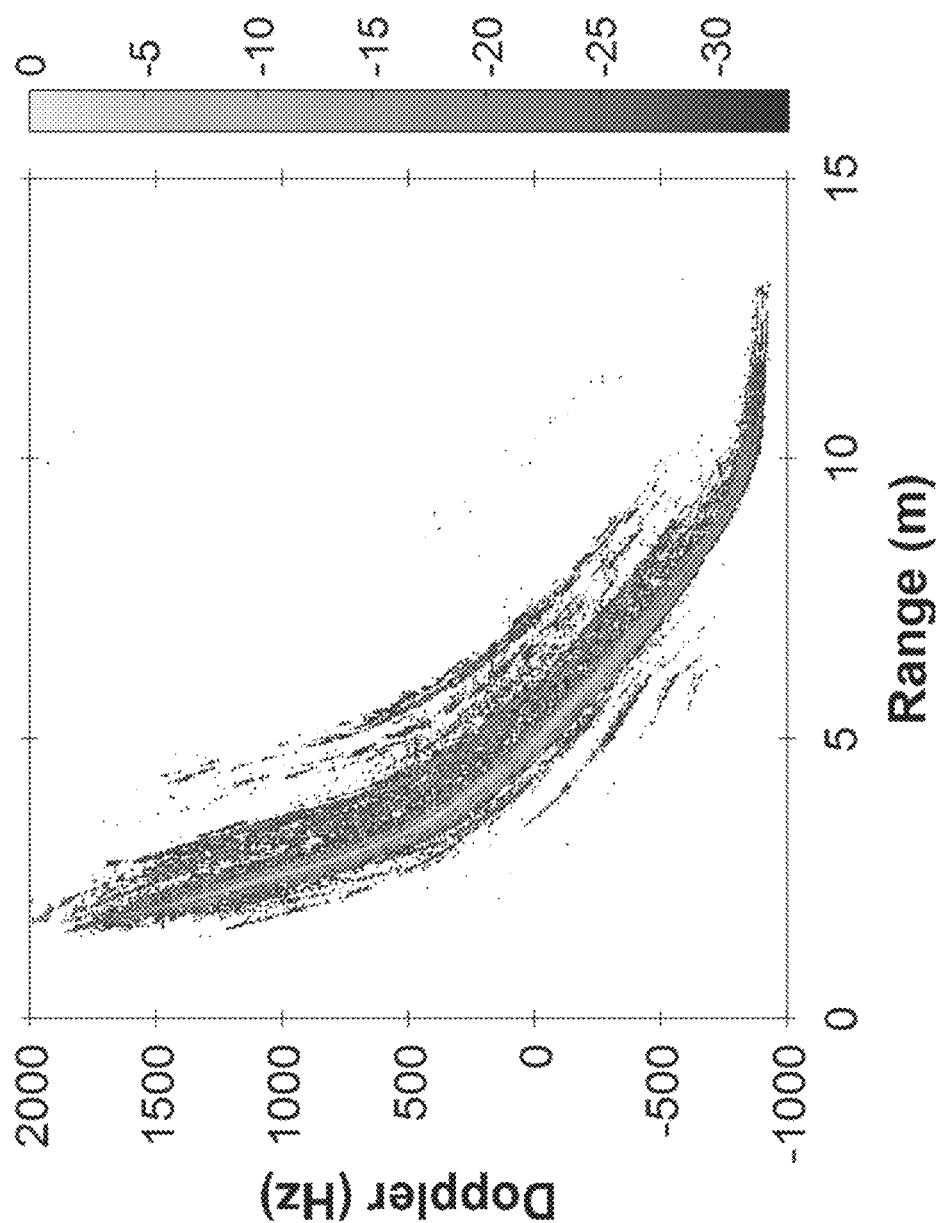
FIG. 14 shows a Range-Doppler map for an automotive test run in which the speaker transmits a 100-235 Hz chirp in accordance with an embodiment of the present disclosure.

To demonstrate the effectiveness of this motion compensation technique using a more complex audio waveform, an additional moving test repeats the preceding experiment for the case in which the audio waveform is a periodic triangular FM chirp swept from 100 to 236 Hz at a rate of ±136 Hz/s. Peak sinusoidal displacement of the speaker varies monotonically from 120 μm to 50 μm over this range. FIG. 14 shows a Range-Doppler map for an automotive test run in which the speaker transmits a 100-235 Hz chirp in accordance with an embodiment of the present disclosure. Peak sinusoidal vibration varies from 120 μm to 50 μm over this range. As illustrated in the range-Doppler map of FIG. 14, the platform motion is highly nonlinear.

Figure 15:
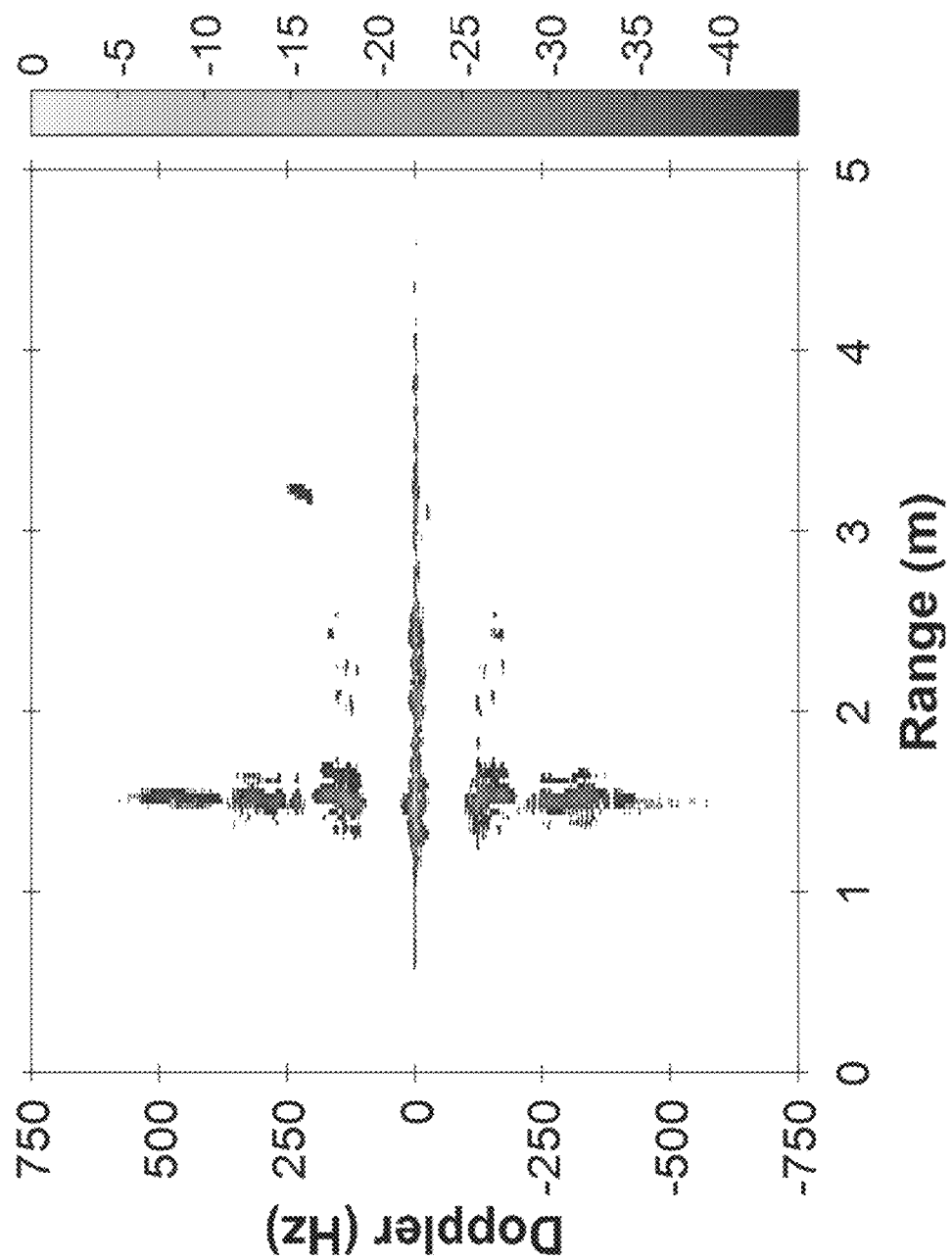
FIG. 15 shows a motion-compensated range-Doppler map for the test run shown in FIG. 14 in accordance with an embodiment of the present disclosure.

FIG. 15 shows a motion-compensated range-Doppler map for the test run shown in FIG. 14 in accordance with an embodiment of the present disclosure. The acoustic response has a more complex structure in comparison to the single tone test in FIG. 12. FIG. 15 shows the same test result after the application of motion compensation. In this case, the acoustic response in Doppler space has greater complexity in comparison to the single tone result of FIG. 12.

Figure 16:
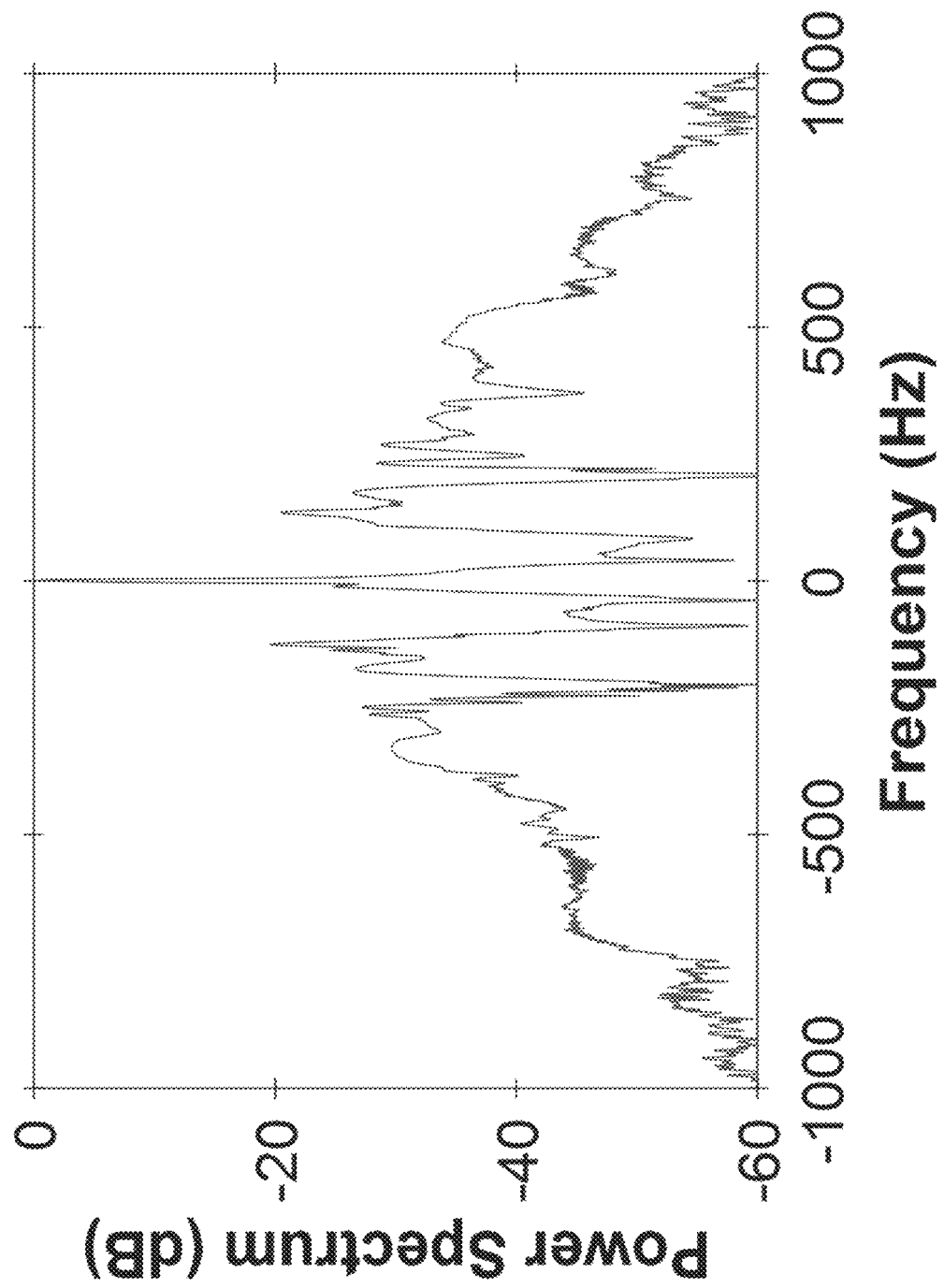
FIG. 16 is a diagram showing magnitude of the complex power spectrum at the range of maximum Doppler vibration in FIG. 15 in accordance with an embodiment of the present disclosure.

FIG. 16 is a diagram showing magnitude of the complex power spectrum at the range of maximum Doppler vibration in FIG. 15 in accordance with an embodiment of the present disclosure. The cross modulation property of phase modulation tends to obscure the FM chirp structure. FIG. 16 again plots the magnitude of the complex radar baseband power spectrum at the range of maximum Doppler variance. Although the cross modulation property of phase modulation tends to obscure the received signal's FM chirp structure, the audio signal reconstructed by radar agrees well with the speaker's original audio transmission. For this experiment, alternative graphical techniques are useful for analyzing and identifying the received audio signature.

Figure 17:
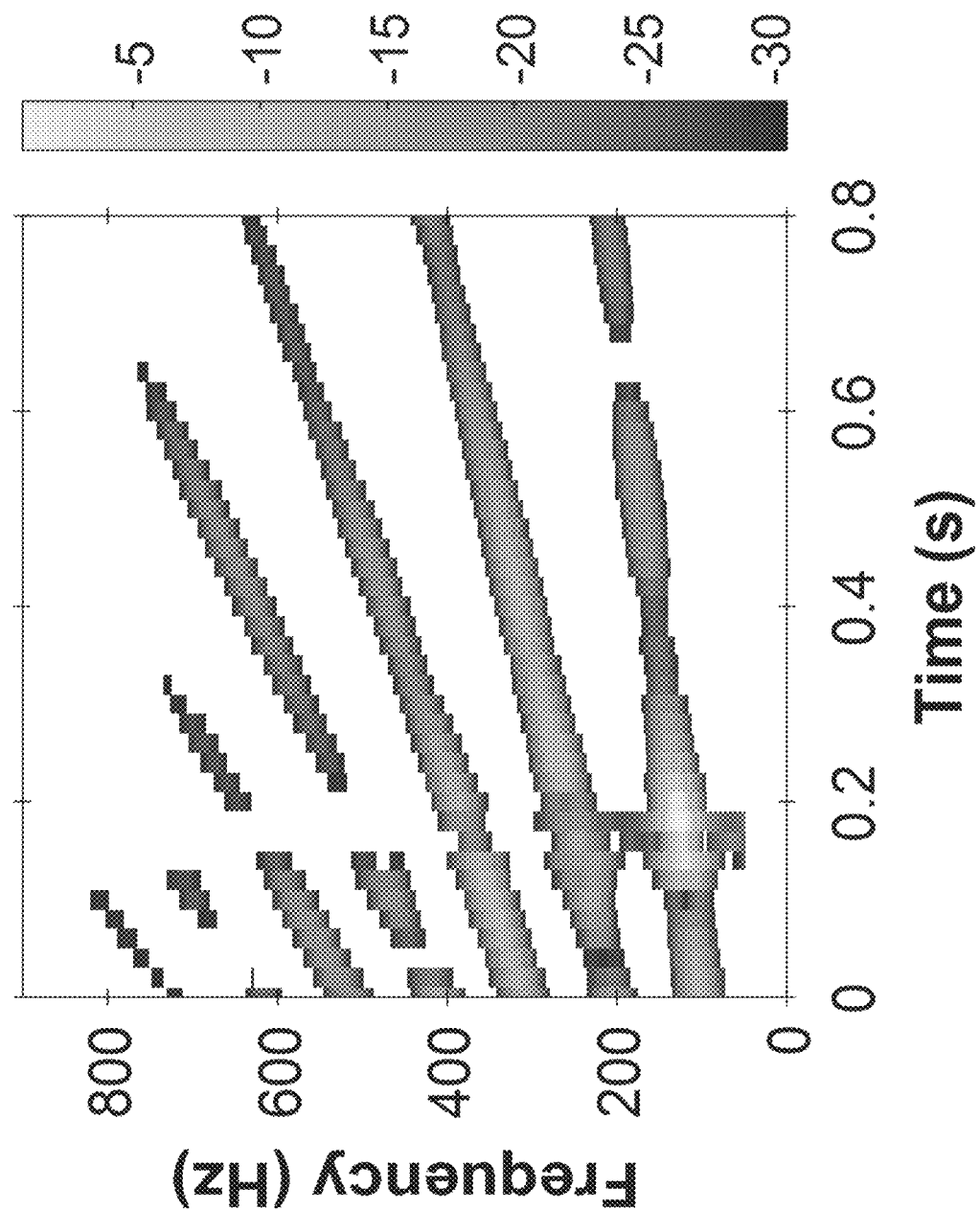
FIG. 17 is a diagram showing the magnitude of the radar's baseband power spectrum vs. time, obtained by application of the short-time Fourier transform, illustrating the underlying FM chirp structure transmitted by the speaker, in accordance with an embodiment of the present disclosure.

FIG. 17 is a diagram showing the magnitude of the radar's baseband power spectrum vs. time, obtained by application of the short-time Fourier transform, illustrating the underlying FM chirp structure transmitted by the speaker, in accordance with an embodiment of the present disclosure. As shown in FIG. 17, using the short-time Fourier transform to plot the magnitude of the radar's baseband power spectrum vs. time clearly illustrates the FM chirp structure transmitted by the speaker. In addition, the cepstrum transform applied to the same data set can be used to plot the instantaneous baseband frequency vs. time, reproducing the original acoustic signal with excellent fidelity.

Figure 18:
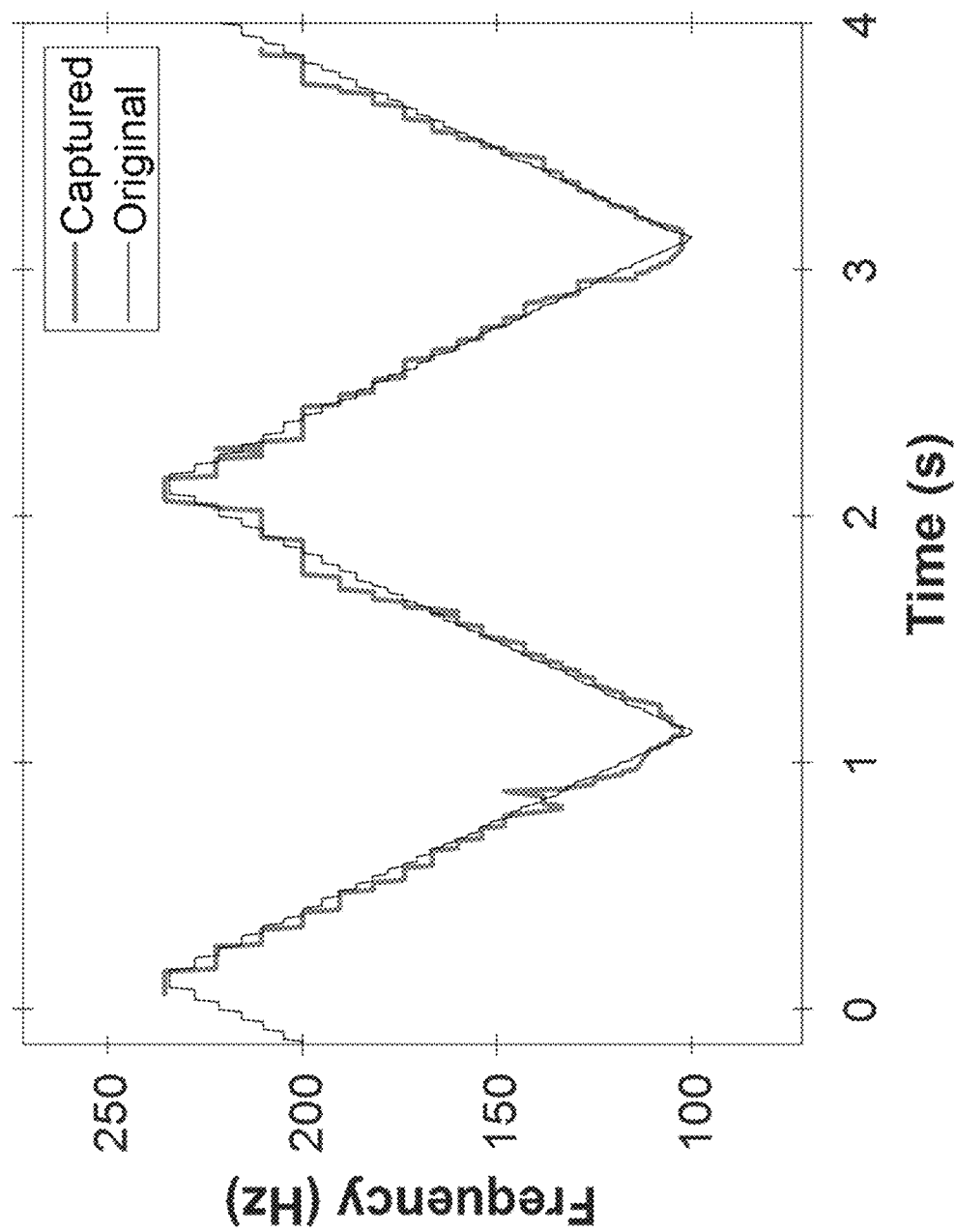
FIG. 18 is a diagram showing a comparison of the instantaneous frequency received by the radar, as calculated using cepstrum analysis, with the audio transmitted by the acoustic speaker in accordance with an embodiment of the present disclosure.

FIG. 18 is a diagram showing a comparison of the instantaneous frequency received by the radar, as calculated using cepstrum analysis, with the audio transmitted by the acoustic speaker in accordance with an embodiment of the present disclosure. The close agreement illustrates the high fidelity of sound reproduction possible using radar vibrometry.

8. Using MMW to Identify the Operation of Parked Car Components

In an embodiment, MMW pulse-Doppler radar can be used to identify safety-critical operating status information for parked cars. In an embodiment, a 94-GHz pulsed linear frequency modulated (LFM) radar with stretch processing on receive provides range-selective detection of small-scale vibration along the length of a parked car. The resulting range-Doppler signature can clearly differentiate whether the car's engine is running or not as well as whether the car's transmission is shifting between "park" and "drive." In an embodiment, the rotational motion of an opening car door also produces a distinct signature in range-Doppler space. Incorporating this knowledge into automotive sensors can alert oncoming vehicles to unanticipated actions of parked cars to avert potential damage or injury.

Stopped vehicles and opening car doors are a major source of car accidents, especially in construction zones, when there is the potential for a vehicle to unexpectedly begin moving or for a car door to unexpectedly open. Doppler phenomenology related to safety-critical feature identification has not yet been significantly exploited for automotive applications and for parked cars in particular. Recent advances have demonstrated the technical capability of MMW pulse-Doppler radar for the vibrometry and sound reproduction of acoustic sources on moving platforms. Embodiments of the present disclosure can exploit these capabilities to investigate the safety-related range-Doppler signatures of parked cars, including the vibration due to engine operation and transmission gear shifting, as well as the opening and closing of a traffic-facing door. Embodiments of the present disclosure can be useful for enhancing future automotive sensors to prevent accidents and injuries related to parked cars.

An exemplary heterodyne MMW pulse-Doppler radar in accordance with an embodiment of the present disclosure operates with a center frequency of 94 GHz, average transmit power of 80 mW, and antenna gain of 23 dB. The radar waveform is a 4 GHz bandwidth linear frequency modulated (LFM) pulse of 100 μs width and 4 kHz pulse repetition frequency (PRF). This bandwidth and transmit power are within the permissible performance envelope of commercial W-band automotive radar but with enhanced flexibility for customized digital processing and extended memory length when compared with off-the-shelf short range MMW radar systems. In an embodiment, the receiver uses stretch processing to constrain the required baseband acquisition bandwidth; the overall receiver noise figure is 7.5 dB. Coherent Hilbert sampling of 4096 pulses over a 4s coherent processing interval using an 8-bit digitizer results in 36 dB processing gain to a calibration target.

Figure 19:
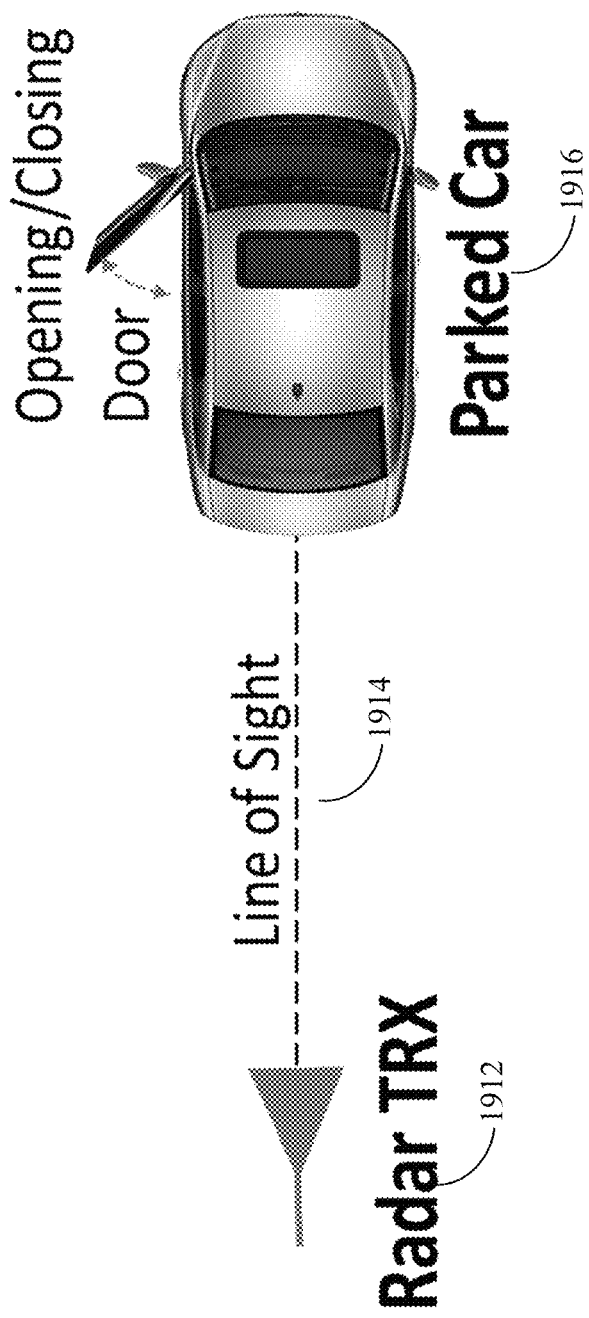
FIG. 19 is a diagram illustrating a radar transceiver (TRX) that interrogates a parked car directly in its line of sight to examine the effect of car operations in accordance with an embodiment of the present disclosure.

In an embodiment, the vehicle under test is a 2006 Infiniti FX35 measuring 4.8×1.9×1.7 m. As illustrated in FIG. 19, the car is parked along the radar's line of sight at a distance of 7.7 m from the radar so that the car fits within radar's beam width. While in park, an operator turns on the car's engine, changes the automatic transmission from park to drive, and opens and closes the driver-side car door.

FIG. 19 is a diagram illustrating a radar transceiver (TRX) 1912 that interrogates a parked car 1916 directly in its line of sight 1914 to examine the effect of car operations in accordance with an embodiment of the present disclosure. In an embodiment, these operations include the engine in operation, automatic transmission gear changes, and an opening/closing driver-side car door. In an embodiment, the distance between the radar and car is 7.7 m.

Based on the micro-Doppler effect, vehicle vibration modulates the Doppler signature of the received radar signal. The induced Doppler offset corresponds directly to the rate of target vibration; these vibrations can be selectively localized along the length of the vehicle using the radar's 3.75 cm range resolution. In the case of the driver's side car door, the rotational motion due to opening and closing also creates a uniquely identifiable Doppler signature, shown in the following section.

Received data from a pulse Doppler radar can be visualized using a "range Doppler map" plotting the Doppler response at each range resolution cell along the radar's line of sight. For a parked car having no engine vibration or other motion, the Doppler response is negligible.

Figure 20:
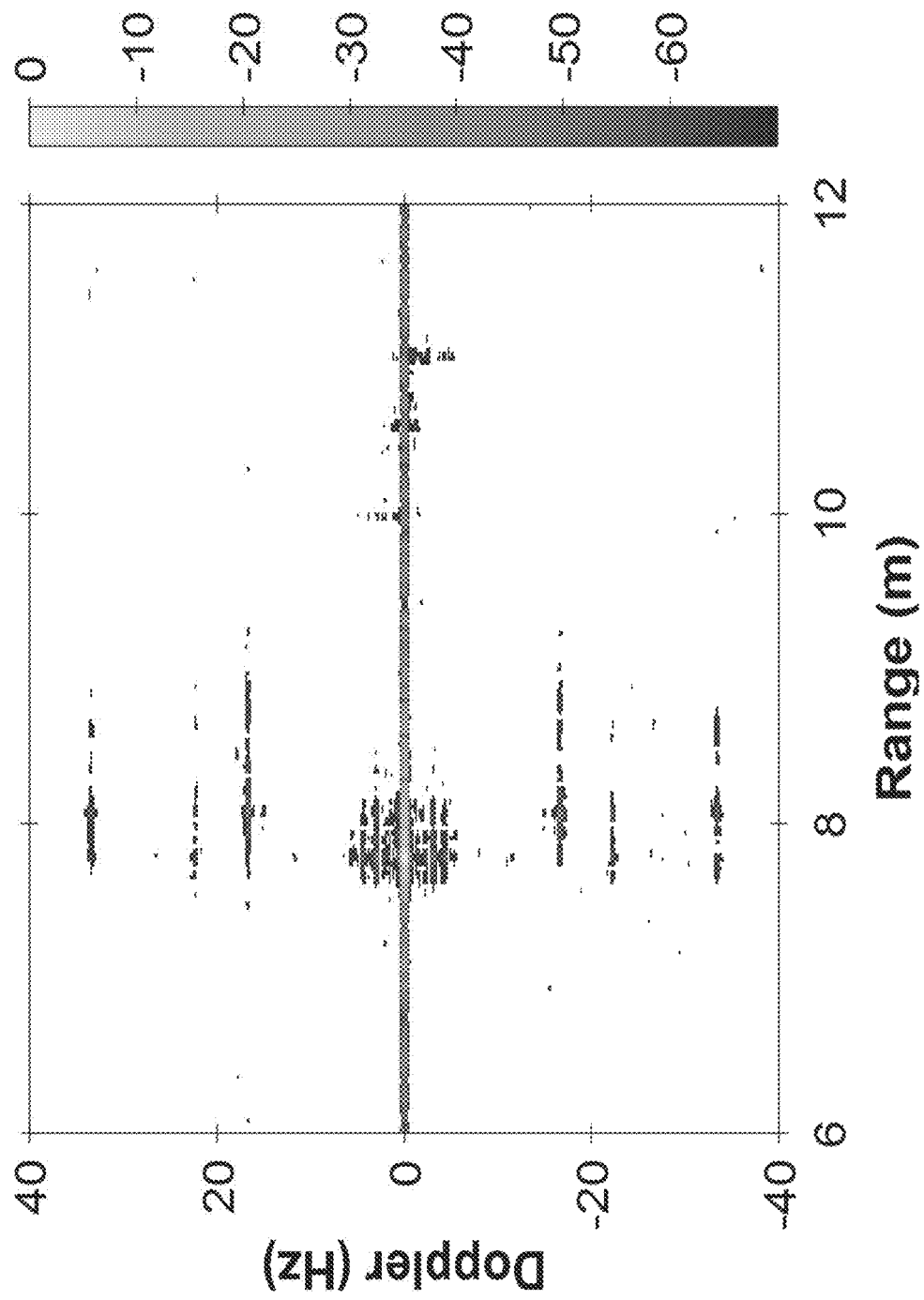
FIG. 20 is a Range Doppler map of the received radar waveform illuminating a car parked with its engine running in accordance with an embodiment of the present disclosure.

FIG. 20 is a Range Doppler map of the received radar waveform illuminating a car parked with its engine running in accordance with an embodiment of the present disclosure. Strong vibrations at the rear of the car are visible in the Doppler response at frequencies <6 Hz, with additional harmonics extending to 34 Hz. FIG. 20 illustrates the result for the case in which the car's engine is running. In an embodiment, the results are similar irrespective of whether the parked car's automatic transmission is in "park," "neutral," "drive," or "reverse." Strong vibrations are visible in the Doppler response at frequencies <6 Hz, with additional harmonics extending to 34 Hz. These vibrations are concentrated at the rear of the vehicle from 7.7 to 8 m, corresponding to the heavy vibration expected from the car's tailpipe.

Figure 21:
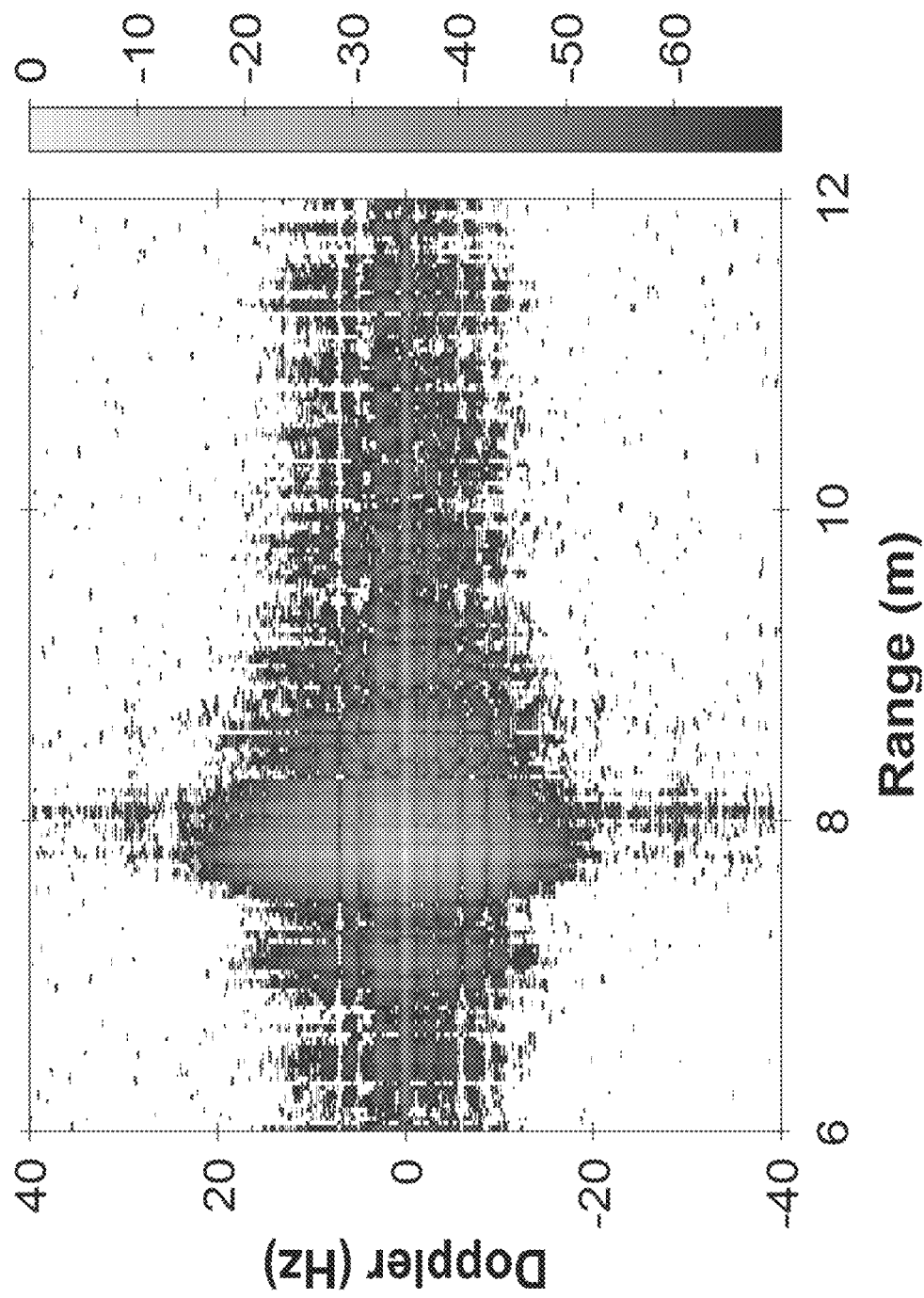
FIG. 21 is a Range Doppler map of the received radar signal when the automatic transmission shifts between "park" and "drive" in accordance with an embodiment of the present disclosure.

In an embodiment, the car's automatic transmission is next shifted between "park" and "drive." FIG. 21 is a Range Doppler map of the received radar signal when the automatic transmission shifts between "park" and "drive" in accordance with an embodiment of the present disclosure. The Doppler response at the rear of the vehicle shows wideband spectral content from DC to 20 Hz, corresponding to the acoustic impulse of the gear change. As shown in FIG. 21, this action produces a strong acoustic impulse visible in the received radar signal as broadband Doppler content from DC to 20 Hz. Again, this signature is primarily localized at the rear of the vehicle. This result demonstrates that is possible for MMW radar to identify if a vehicle is preparing to go into motion.

Finally, the parked car's driver-side door opens and shuts repeatedly during the radar's 4 s coherent processing interval. FIG. 22 is a plot illustrating the range-Doppler map of the received radar waveform in accordance with an embodiment of the present disclosure. The closing motion has a positive Doppler response since the door is moving toward the radar; likewise, opening the door creates a negative Doppler response. The Doppler response is localized to the range of the door, with a "V" shaped characteristic resulting from the primarily rotational motion of the scatterers on the door. If the door's axis of rotation were about the center point of the door, the range-Doppler response of opening/closing would be a purely vertical negative/positive spike on the range-Doppler map, respectively. However, because the door's axis of rotation is at the far end of the door, with respect to the radar, there is an increase in range for the door's scatterers as it opens, and a decrease in range as it closes. Hence, a closing door produces an inverted "V" signature (positive Doppler, decreasing range), and the opening door produces a non-inverted "V" signature (negative Doppler, increasing range). In both cases, the change in range corresponds to the length ΔR of the door, and point of maximum Doppler corresponds to the velocity of the scatterer on the door at the point furthest from the hinge of rotation, as illustrated in FIG. 23. Since a parked car is unlikely to produce other motions of this nature, this signature should provide a robust indicator for an opening or closing car door.

FIG. 23 shows diagrams illustrating that the change in range corresponds to the length ΔR of the door and that the point of maximum Doppler corresponds to the velocity of the scatterer on the door at the point furthest from the hinge of rotation in accordance with an embodiment of the present disclosure. In an embodiment, for the case of a closing door, the Doppler response is positive, and the range of the scatterers decreases with respect to the radar. In an embodiment, the point of maximum Doppler corresponds to the scatterer furthest from the hinge of the door. In an embodiment, for an opening door, the signature is inverted as shown in FIG. 22.

9. Exemplary Advantages

Embodiments of the present disclosure demonstrate the technical capability of MMW radar as a remote sensing technique for the vibrometry and sound reproduction of acoustic sources on moving platforms. A hierarchical motion compensation technique blends direct and indirect estimation in radar fast time and slow time to align coherent pulses in range and phase so that the resulting complex baseband response accurately reproduces acoustic vibration at selected locations along a moving platform. Experimental results are obtained using a speaker as an acoustic source in the rear of an automobile as it accelerates across a monostatic MMW radar test range. Motion-compensated pulse-Doppler radar data reproduce the target's acoustic signature with high fidelity in a series of experimental demonstrations.

Radar systems customized for this application, with enhanced transmit power and improved angular resolution, should be able to extend the operational range of this MMW technique, making it possible to add a new dimension of sound reproduction to conventional SAR images. Embodiments of the present disclosure can be used to identify or fingerprint sources of sound on moving objects based on their acoustic signature, such as engine vibration. For example, in an embodiment, fingerprints can be generated for respective sources of acoustic signals, and these fingerprints can be analyzed against later detected signals to determine whether a match has occurred (and thus that the source of the signal has been identified). Embodiments of the present disclosure can reproduce sound/vibration from objects undergoing large scale motion, can extend to long range, and can add additional dimension of sound to traditional SAR or ISAR imagery, to monopulse tracking radars, etc.

Further, it should be understood that embodiments of the present disclosure can be used to detect and compensate for motion from a variety of sources. For example, a motion compensator in accordance with an embodiment of the present disclosure can be used to receive sound from a human being (e.g., voice sound) on a moving platform and can be used to compensate for the motion in the received sound. For further example, a motion compensator in accordance with an embodiment of the present disclosure can be used to receive non-voice sound from a human being (e.g., noise made while walking or moving) on a moving platform and can be used to compensate for the motion in the received sound.

10. Conclusion

It is to be appreciated that the Detailed Description, and not the Abstract, is intended to be used to interpret the claims. The Abstract may set forth one or more but not all exemplary embodiments of the present disclosure as contemplated by the inventor(s), and thus, is not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Any representative signal processing functions described herein can be implemented using computer processors, computer logic, application specific integrated circuits (ASIC), digital signal processors, etc., as will be understood by those skilled in the art based on the discussion given herein. Accordingly, any processor that performs the signal processing functions described herein is within the scope and spirit of the present disclosure.

The above systems and methods may be implemented using a computer program executing on a machine, using a computer program product, or using a tangible and/or non-transitory computer-readable medium having stored instructions. For example, the functions described herein could be embodied by computer program instructions that are executed by a computer processor or any one of the hardware devices listed above. The computer program instructions cause the processor to perform the signal processing functions described herein. The computer program instructions (e.g., software) can be stored in a tangible non-transitory computer usable medium, computer program medium, or any storage medium that can be accessed by a computer or processor. Such media include a memory device such as a RAM or ROM, or other type of computer storage medium such as a computer disk or CD ROM. Accordingly, any tangible non-transitory computer storage medium having computer program code that cause a processor to perform the signal processing functions described herein are within the scope and spirit of the present disclosure.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments.

What is claimed is:

1. A radar system, comprising:
a radar configured to:
send a signal towards a moving object, and
receive a return signal; and
a motion compensator configured to:
receive the return signal from the radar,
determine a direct estimate for a velocity of the object based on the return signal,
determine an indirect estimate for the velocity based on an entropy optimization of the determined direct estimate for the velocity, thereby generating ranged aligned data,
determine an indirect estimate for quadratic phase error in the ranged aligned data based on entropy optimization, and
perform a phase gradient autofocus (PGA) process on the ranged aligned data, based on the indirect estimate for the quadratic phase error, thereby generating a motion compensated signal.

2. The radar system of claim 1, wherein the motion compensator is further configured to:
perform pulse-by-pulse estimation of a plurality of time shifts to determine the direct estimate for the velocity of the object based on the return signal.

3. The radar system of claim 1, wherein the motion compensator is further configured to:
determine the indirect estimate based on entropy optimization of quadratic phase error and a nonlinear motion model.

4. The radar system of claim 1, wherein the motion compensator is further configured to:
determine a time delay that maximizes a correlation between a reference pulse and a pulse profile in the return signal; and
determine the direct estimate for the velocity of the object based on the time delay.

5. The radar system of claim 4, wherein the reference pulse is a composite of a plurality of pulse profiles in the return signal before the pulse profile.

6. The radar system of claim 5, wherein the reference pulse is a composite of all pulse profiles in the return signal before the pulse profile.

7. The radar system of claim 5, wherein each pulse profile in the plurality of pulse profiles is shifted by a respective determined time delay.

8. The radar system of claim 1, wherein the motion compensator is further configured to:

determine respective time delays that maximize respective correlations between respective reference pulses and respective pulse profiles in the return signal for each pulse profile in a plurality of pulse profiles in the return signal;
determine a delay vector based on the respective time delays; and
determine the direct estimate for the velocity of the object based on the delay vector.

9. The radar system of claim 8, wherein the motion compensator is further configured to:
determine a direct estimate for an acceleration of the object based on the delay vector.

10. The radar system of claim 9, wherein the motion compensator is further configured to:
determine an optimized velocity, based on the determined velocity, such that the optimized velocity minimizes entropy;
determine an optimized acceleration, based on the determined acceleration, such that the optimized acceleration minimizes entropy; and
align the plurality of pulse profiles based on the optimized velocity and the optimized acceleration, thereby generating the ranged aligned data.

11. The radar system of claim 1, wherein the motion compensator is further configured to:
convert the ranged aligned data to a range-Doppler map;
minimize a two dimensional (2D) entropy of the range-Doppler map; and
determine the indirect estimate for the quadratic phase error based on the minimized 2D entropy of the range-Doppler map.

12. The radar system of claim 1, wherein the motion compensator is further configured to:
perform five iterations of the PGA process on the ranged aligned data.

13. The radar system of claim 1, wherein the return signal comprises information that can be used to reproduce a voice signal generated by a human on the moving object.

14. The radar system of claim 1, wherein the return signal comprises information that can be used to reproduce a signal generated by movement of a human.

15. The radar system of claim 1, wherein the return signal comprises information that can be used to reproduce an acoustic signal.

16. The radar system of claim 15, wherein the motion compensator is further configured to:
generate a fingerprint for a source of the acoustic signal, thereby associating the source with the acoustic signal.

17. The radar system of claim 16, wherein the motion compensator is further configured to:
determine whether the fingerprint matches a respective fingerprint in a plurality of stored fingerprints; and
identify the source in response to a determination that the fingerprint matches a fingerprint in a plurality of stored fingerprints.

18. The radar system of claim 1, wherein the radar system is a millimeter wave (MMW) radar system.

19. A radar system, comprising:
a radar configured to receive a signal from a moving object; and
a motion compensator configured to:
determine respective time delays that maximize respective correlations between respective reference pulses and respective pulse profiles in the signal for each pulse profile in a plurality of pulse profiles in the signal,
determine a delay vector based on the respective time delays,
determine a velocity of the object based on the delay vector,
determine an acceleration of the object based on the delay vector,
determine an optimized velocity, based on the determined velocity, such that the optimized velocity minimizes entropy,
determine an optimized acceleration, based on the determined acceleration, such that the optimized acceleration minimizes entropy,
align the plurality of pulse profiles based on the optimized velocity and the optimized acceleration, thereby generating ranged aligned data,
convert the ranged aligned data to a range-Doppler map,
minimize a two dimensional (2D) entropy of the range-Doppler map,
determine an estimate for a quadratic phase error based on the minimized 2D entropy of the range-Doppler map, and
perform a phase gradient autofocus (PGA) process on the ranged aligned data, based on the indirect estimate for the quadratic phase error, thereby generating a motion compensated signal.

20. A radar system, comprising:
a radar configured to:
send a signal towards a moving object, and
receive a return signal; and
a motion compensator configured to:
receive the return signal from the radar,
determine a direct estimate for a velocity of the object based on the return signal,
determine a direct estimate for an acceleration of the object based on the return signal,
determine respective indirect estimates for the velocity and acceleration based on an entropy optimization of the determined direct estimate for the velocity and the determined direct estimate for the acceleration, thereby generating ranged aligned data,
determine an indirect estimate for quadratic phase error in the ranged aligned data based on entropy optimization, and
perform a phase gradient autofocus (PGA) process on the ranged aligned data, based on the indirect estimate for the quadratic phase error, thereby generating a motion compensated signal.

* * * * *